United States Patent [19]

Taniguchi et al.

[11] Patent Number: 4,843,418

[45] Date of Patent: Jun. 27, 1989

[54] PHOTOGRAPHIC CAMERA

[75] Inventors: Nobuyuki Taniguchi; Yoshiaki Hata, both of Nishinomiya; Yoshinobu Kudo, Sakai; Manabu Inoue, Kobe; Takeo Hoda, Kawachinagano; Hiroshi Ueda, Toyokawa, all of Japan

[73] Assignee: Minolta Camera Kabushiki Kaisha, Osaka, Japan

[21] Appl. No.: 207,238

[22] Filed: Jun. 16, 1988

Related U.S. Application Data

[62] Division of Ser. No. 895,826, Aug. 12, 1986, Pat. No. 4,780,735.

[30] Foreign Application Priority Data

| Aug. 29, 1985 | [JP] | Japan | 60-190520 |
| Aug. 29, 1985 | [JP] | Japan | 60-190521 |
| Aug. 29, 1985 | [JP] | Japan | 60-190522 |
| Aug. 29, 1985 | [JP] | Japan | 60-190523 |
| Aug. 30, 1985 | [JP] | Japan | 60-192621 |
| Sep. 10, 1985 | [JP] | Japan | 60-201095 |
| Sep. 10, 1985 | [JP] | Japan | 60-201096 |
| Nov. 14, 1985 | [JP] | Japan | 60-255550 |
| Dec. 19, 1985 | [JP] | Japan | 60-286732 |

[51] Int. Cl.$^4$ .............. G03B 7/097; G03B 15/05; G03B 17/24

[52] U.S. Cl. .............. 354/419; 354/422; 354/435; 354/137; 354/106

[58] Field of Search .............. 354/414, 419, 420, 422, 354/435–440, 137, 105, 106

[56] References Cited

U.S. PATENT DOCUMENTS

| 3,029,717 | 4/1962 | Hildebrandt | 354/106 |
| 3,827,070 | 7/1974 | Hoerenz | 354/105 |
| 3,978,496 | 8/1976 | Matsumoto | 354/419 |
| 4,086,582 | 4/1978 | Kiyohara et al. | 354/419 X |
| 4,182,560 | 1/1980 | Oguchi | 354/106 |
| 4,316,658 | 2/1982 | Bundschuk | 354/422 |
| 4,354,748 | 10/1982 | Grimes et al. | 354/422 |
| 4,457,601 | 7/1984 | Kondo et al. | 354/420 X |
| 4,500,191 | 2/1985 | Yamanaka | 354/419 X |
| 4,730,202 | 3/1988 | Watanabe et al. | 354/420 X |
| 4,733,263 | 3/1988 | Taniguchi et al. | 354/419 |

FOREIGN PATENT DOCUMENTS

| 0054762 | 6/1982 | European Pat. Off. |
| 48-6733 | 1/1973 | Japan |
| 54-26721 | 2/1979 | Japan |
| 58-127918 | 7/1983 | Japan |
| 58-152227 | 9/1983 | Japan |
| 59-164037 | 11/1984 | Japan |
| 59-164043 | 11/1984 | Japan |
| 60-145428 | 9/1985 | Japan |

OTHER PUBLICATIONS

Minolta 7000 Product Guide.

Primary Examiner—W. B. Perkey
Attorney, Agent, or Firm—Burns, Doane, Swecker & Mathis

[57] ABSTRACT

The photographic camera which prints a code signal representing printing information on a film is capable of selecting a real focal length photographing mode for printing a normal range of a frame, a plurality of pseudo focal length photographing mode each being different in pseudo focal length from the other, and a close-up photographing mode. Exposure condition is limited in accordance with the selected mode. Upon selection of the photographing modes, a code signal indicative of said selection is produced and printed between frames on the film surface. The film after photographing with this camera is subjected to printing by means of a printer which reads the code signal printed on the film surface, determines an exposure value in accordance with the code signal and determines an enlargement ratio.

2 Claims, 19 Drawing Sheets

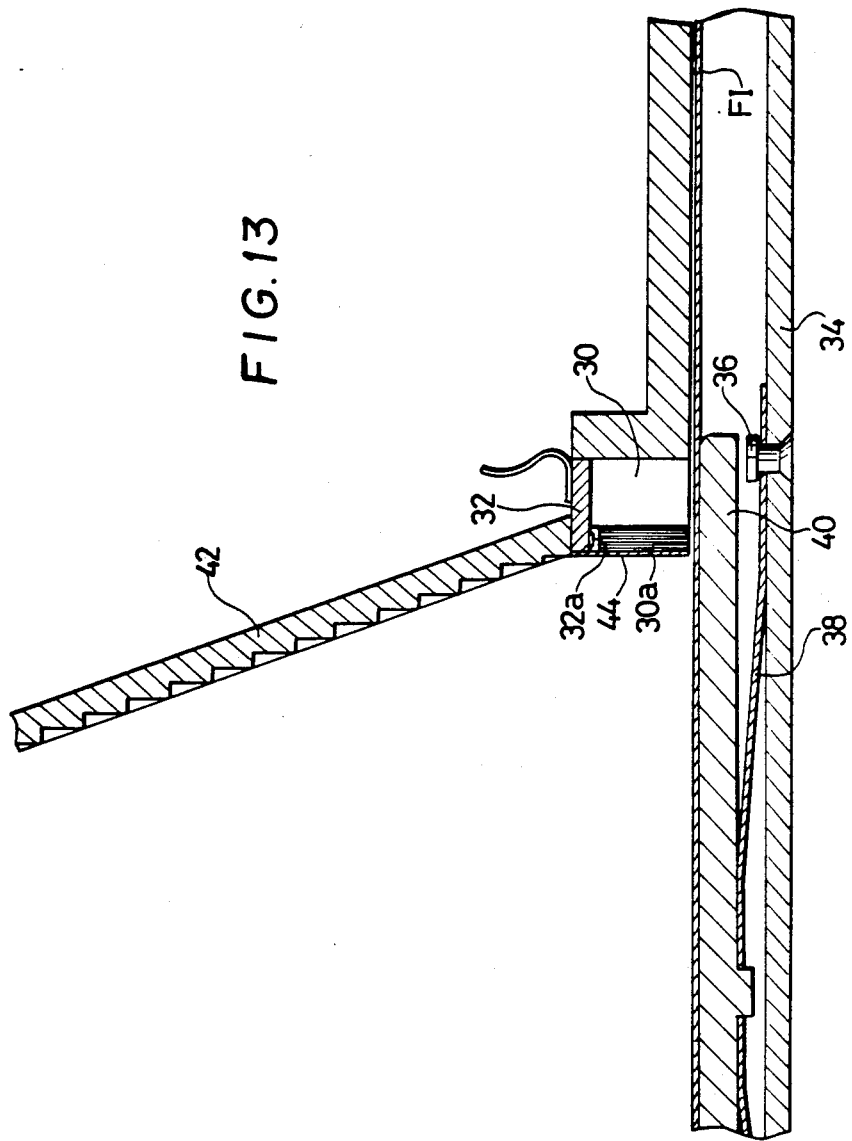

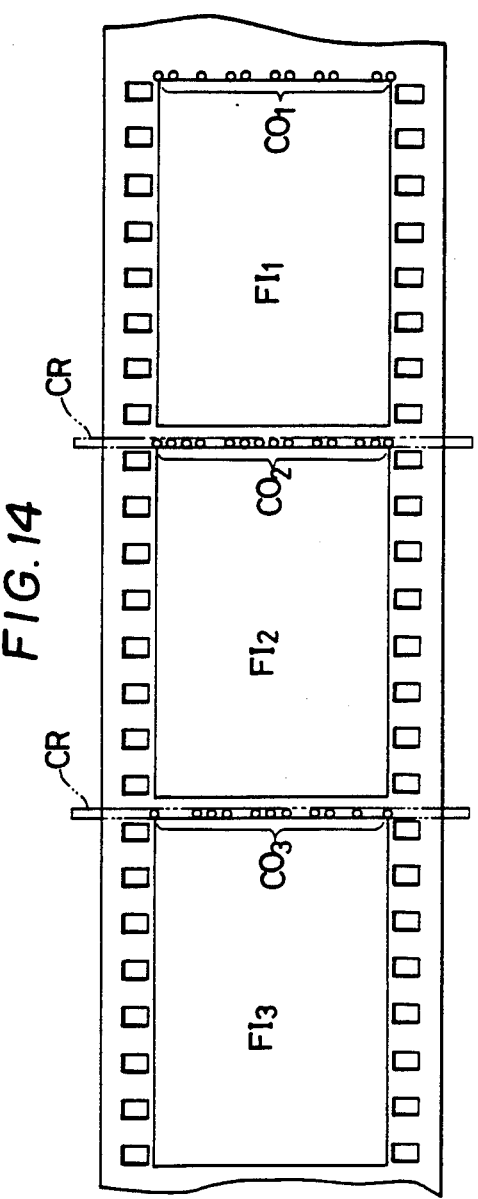
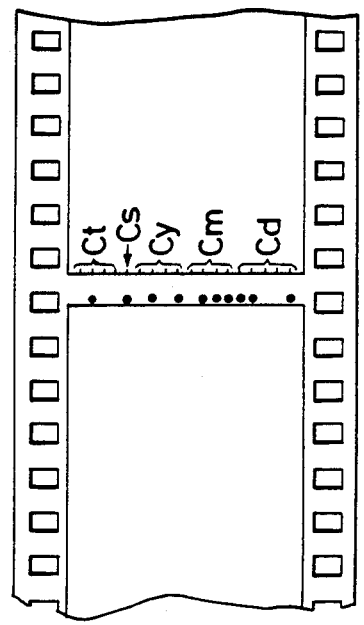
FIG.14
FIG.15

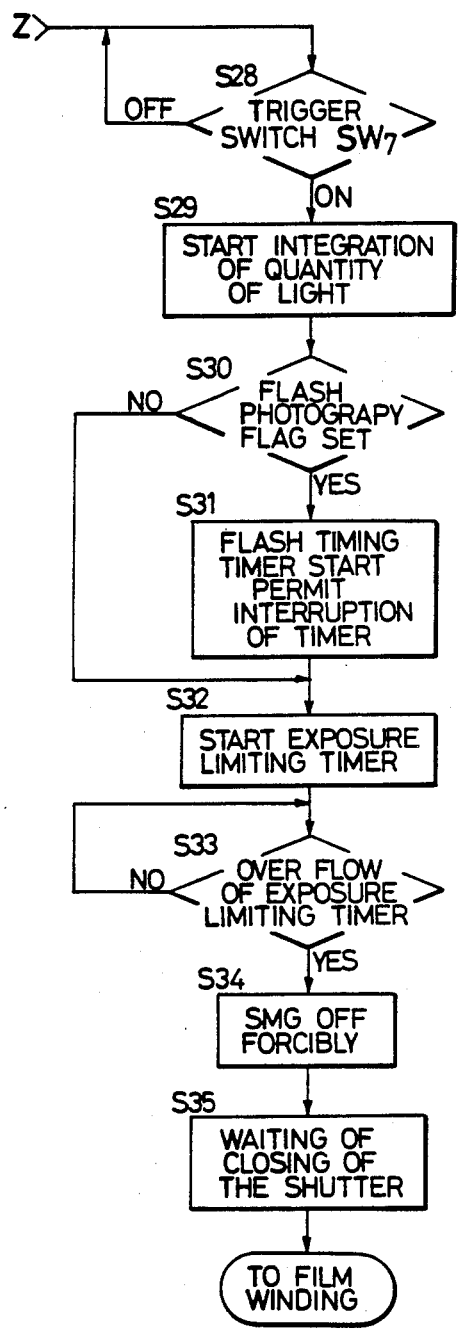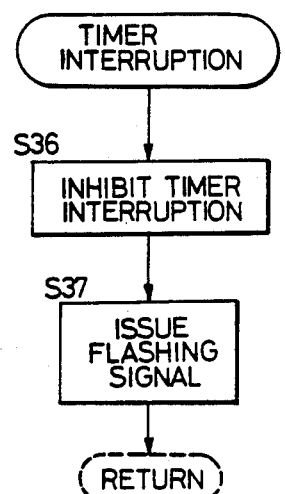

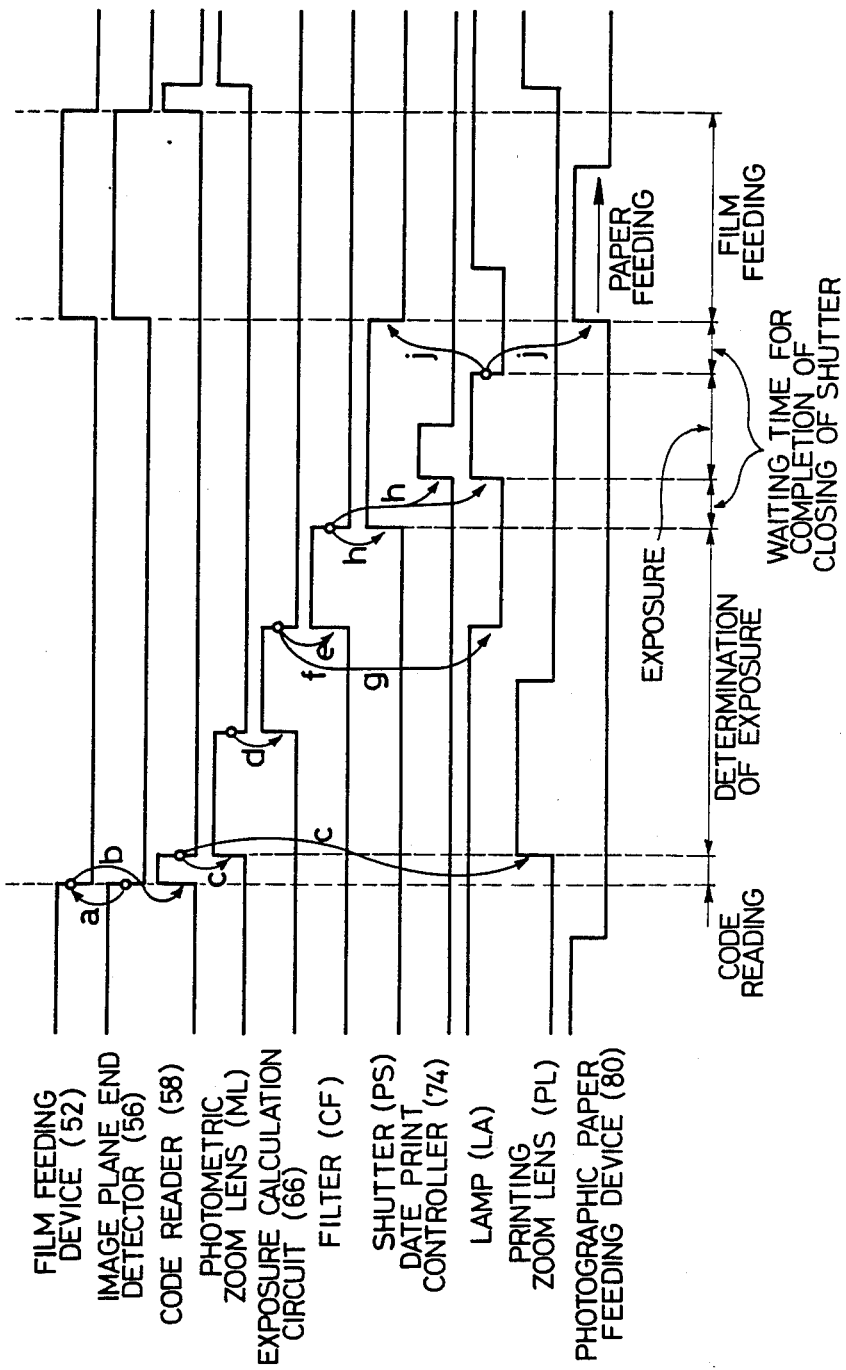

PHOTOGRAPHIC CAMERA

This application is a divisional of application Ser. No. 895,826, filed Aug. 12, 1986, now U.S. Pat. No. 4,780,735.

BACKGROUND OF THE INVENTION

1. Field of the Invention

The present invention relates to a photographic camera for photographing an object onto a film.

2. Description of the Prior Art

A camera capable of changing over between a real focal length photographing mode or normal photographing mode for photographing a real focal length photographing range or normal photographing range on a film and printing said range and a pseudo focal length mode in which a range narrower than the real focal length photographing range is indicated and the indicated range alone is printed, has already been proposed in Japanese Laid Open Pat. No. 26721/79 and in U.S. Pat. No. 3,490,844.

However if such a camera is constructed so that the brightness of the whole real focal length photographing range is measured photometrically by a light measuring means and an exposure control is made on the basis of results of the light measurement, then even a photographing range not printed on a photographic paper in the pseudo focal length photographing mode will be measured photometrically. Thus, if an exposure control is made on the basis of such a result in the pseudo focal length photographing mode, there is a possibility an appropriate exposure will not be obtained with respect to the printed range in the pseudo focal length photographing mode. For example, if an object having an extremely high luminance as compared with other objects, such as the sun, is located in a corner of the real focal length photographing range, the high luminance object (the sun) will not be printed on a photographic paper in the pseudo focal length photographing mode. If in such a situation there is made an averaged light measurement for the whole real focal length photographing range and an exposure control is made on the basis of results obtained, an extreme under-exposure will result with respect to an object of the range printed in the pseudo focal length photographing mode. Conversely, in the case where an object illuminated with a spot light and thus having a luminance much higher than that of other objects is located centrally of the real focal length photographing range, if there is made an averaged light measurement for the whole real focal length photographing range and an exposure control is performed on the basis of results obtained, an extreme overexposure will result with respect to an object of the range printed in the pseudo focal length photographing mode.

This can also be said of a printer of the type in which an image memorized on a photographed film is printed on a photographic paper. More particularly, in the case of a frame photographed in the pseudo focal length mode, only a part of the photographed range on the frame is printed on the photographic paper. Thus, if the brightness of the entire range of the frame is measured and exposure value and color balance are determined on the basis of results obtained, then even the range not printed on the photographic paper is subjected to the light measurement and the result is taken into account in the determination of exposure value and color balance. Therefore it is possible that a print having appropriate density and color balance will not be obtained with respect to the range printed in the pseudo focal length photographing mode.

Further, where a frame photographed in the pseudo focal length photographing mode in the above camera is enlarged to a print of the same size as that of a frame photographed in the real focal length photographing mode, the print enlargement ratio inevitably becomes larger in the pseudo focal length photographing mode frame than in the real focal length photographing mode frame. Consequently, in the case of printing the frame photographed in the pseudo focal length photographing mode, blurring of the object image on the film caused by vibration of the camera, which has not caused any problem in the real focal length photographing mode, becomes conspicuous and therefore image quality of the print is degraded.

With respect to the image quality of the print, as the enlargement ratio, in printing becomes larger, the film particles become more conspicuous on the print. The result is that a poor print is obtained especially in the case of a high sensitivity film poor in particle properties.

SUMMARY OF THE INVENTION

It is an object of the present invention to provide a camera capable of affording an appropriate exposure in the pseudo focal length photographing mode mentioned above.

It is another object of the present invention to provide a camera capable of preventing the deterioration of image quality caused by the enlargement ratio of the printing in the pseudo focal length photographing mode being larger than that in the normal photographing mode.

Other objects and features of the invention will become apparent from the following description taken in connection with the accompanying drawings.

BRIEF DESCRIPTION OF THE DRAWINGS

FIG. 13 is a partially enlarged transverse sectional view of the code printing unit;

FIG. 14 illustrates a film on which are printed the code signals, viewed from the back;

FIG. 15 illustrates code signals printed on the film;

FIGS. 20A, 20B, 20C and 21 are flow charts showing operation of a controlling microcomputer used in the camera;

FIG. 28 is a time chart showing operations thereof.

DETAILED DESCRIPTION OF THE PREFERRED EMBODIMENT

An embodiment of the present invention will be described in detail hereinunder with reference to the accompanying drawings.

Figure 1:
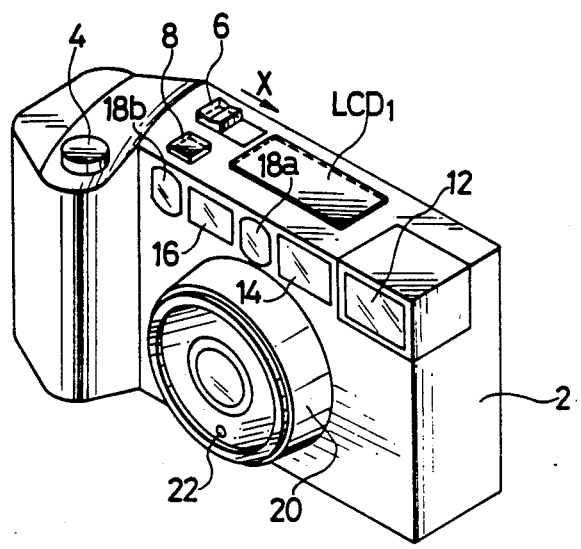
FIG. 1 is a perspective view of a camera according to an embodiment of the present invention.
Figure 2:
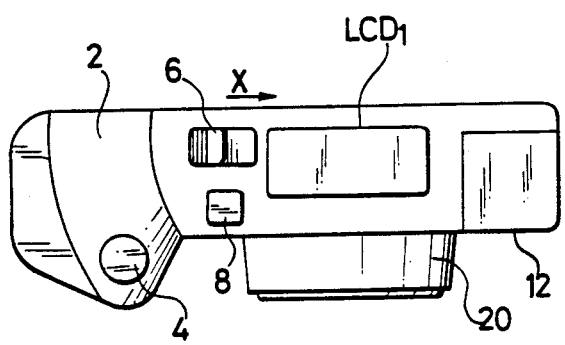
FIG. 2 is a top view thereof.

In FIG. 1, which is a perspective view of a camera embodying the present invention, the reference numeral 2 denotes a camera body; numeral 4 denotes a shutter release button; numeral 6 denotes a date selection switch for selecting whether a date is to be printed or not on a photographic paper during the printing operation; numeral 8 denotes a trimming setting button for setting whether pseudo focal length photographing mode is set or not and its printing size; and $LCD_1$ represents a liquid crystal display for displaying various data related to photographing. The shutter release button 4, date selection switch 6 and trimming setting button 8 are disposed on an upper surface of the camera body 2 as shown in the top view of FIG. 2. The date selection switch 6 is a slide type; in its position shown, the data is printed, while when it is slid in the X direction in the figure, the date is no longer printed. Either of the real focal length photographing mode or normal photographing mode and the pseudo focal length photographing mode, and the ratio of trimming in the latter are determined according to the number of depressions of the button 8. As will be described later, when a film having a sensitivity below ISO 400 is loaded, the trimming setting button 8 is not depressed at all, under which condition the pseudo focal length photographing mode is not selected and the whole of a real focal length photographing rang or normal photographing range is printed. When the trimming setting button 8 is depressed once, a trimming "1" mode is obtained in which a little narrower photographing range than the real focal length photographing range is printed. Depressing it twice affords a trimming "2" mode of a still narrower printing range, and depressing it three times results in a trimming "3" mode of the narrowest printing range. If it is further depressed, there will be obtained a close-up mode as will be described later. A still further depression of the trimming setting button 8 will result in return t the real focal length photographing mode. Details on this respect will be set forth later.

Figure 3:
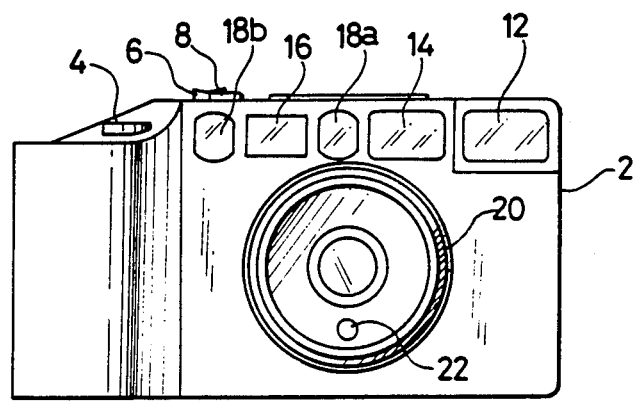
FIG. 3 is a front view thereof.

In FIG. 1, moreover, the numeral 12 denotes a flash unit portion; numeral 14 denotes a finder window; numeral 16 denotes a finder illuminating window; and numerals 18a and 18b represent a pair of range finder windows. These are arranged on a front face of the camera body 2 as shown in the front view of FIG. 3. Numerals 20 and 22 denote a photographing lens and a light measuring window for automatic exposure control.

Figure 4:
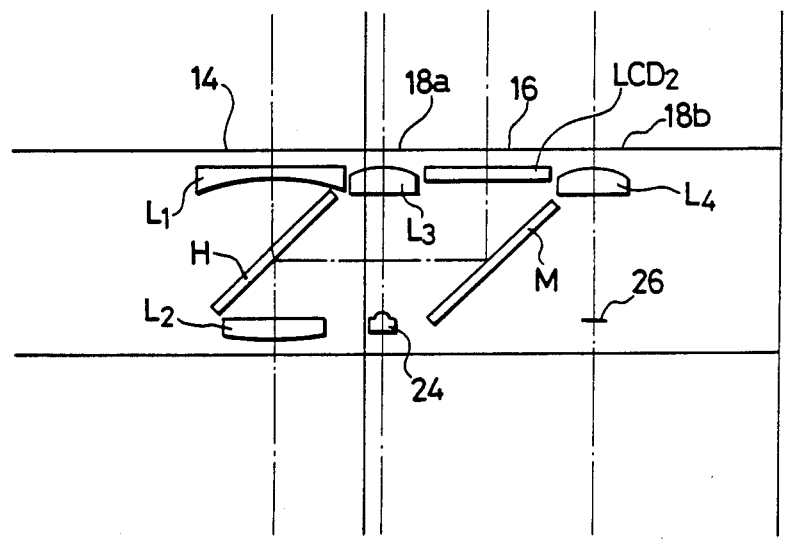
FIG. 4 is a sectional view showing a construction of a finder optical system and a range finding optical system both used in the camera.

FIG. 4 is a sectional view showing a finder optical system and a range finding optical system both used in such camera. In FIG. 4, the finder optical system is constituted by an inverted Galilean type optical system comprising an objective lens $L_1$ having a negative refractive power and an eyepiece lens $L_2$ having a positive refractive power, both disposed in the interior of the finder window. Between the objective lens $L_1$ and the eyepiece lens $L_2$ is disposed a half mirror H whereby light which has been reflected by a mirror M after passing through a liquid crystal display $LCD_2$ disposed behind the finder lighting window 16 is conducted to the finder. On the other hand, behind the range finder window 18a is disposed a light emitting diode 24 for range finding to project an infrared light beam to an object through a projection lens $L_3$. Light reflected from the object is detected by a light detecting element 26 for range finding through a light receiving lens $L_4$ disposed behind the range finder window 18b, and from the state of light detected the distance to the object is determined. This range finding principle is already well known, so its details are here omitted.

Figure 5:
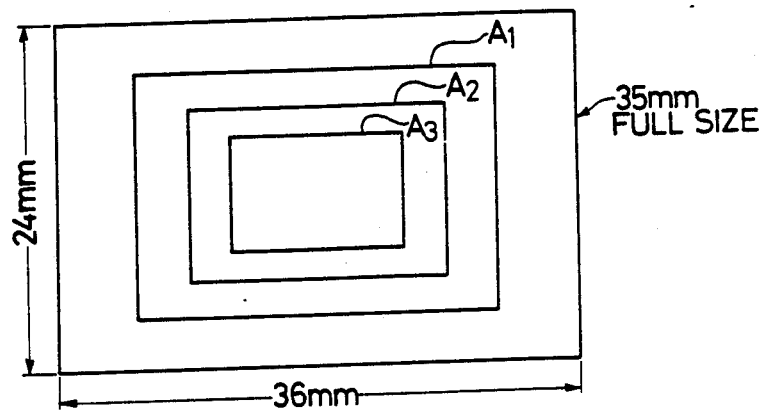
FIG. 5 is a schematic view showing printing range in the pseudo focal length photographing mode.

The printing range in the selection of pseudo focal length photographing mode will now be explained with reference to FIG. 5, which is a front view showing on exposure plane of an ordinary 35 mm film. In the real focal length photographing mode not selecting the pseudo focal length photographing mode, the whole range of 24 mm long by 36 mm wide is printed on a printing paper. In the trimming "1" mode, the range indicated by $A_1$ is printed; in the trimming "2" mode, the range indicated by $A_2$ is printed; and in the trimming "3" mode, the range indicated by $A_3$ is printed. The ratios of the print ranges on the film in the trimming "1", "2" and "3" modes relative to the real focal length photographing mode are set as approximately 1:1 /$\sqrt{2}$:$\frac{1}{2}$:$\frac{1}{3}$. Therefore, in the case where frames after photographing in those modes are enlarged to the same size, there are printed the same ranges as those photographed by lenses of the pseudo focal lengths shown in Table 1 below, provided a focal length, f, of the photographing lens is assumed to be 35 mm.

TABLE 1

| Photographing Mode | Focal Length |
| --- | --- |
| Normal Mode | 35 mm |
| Trimming "1" Mode | 50 mm |
| Trimming "2" Mode | 70 mm |
| Trimming "3" Mode | 105 mm |

Figure 6:
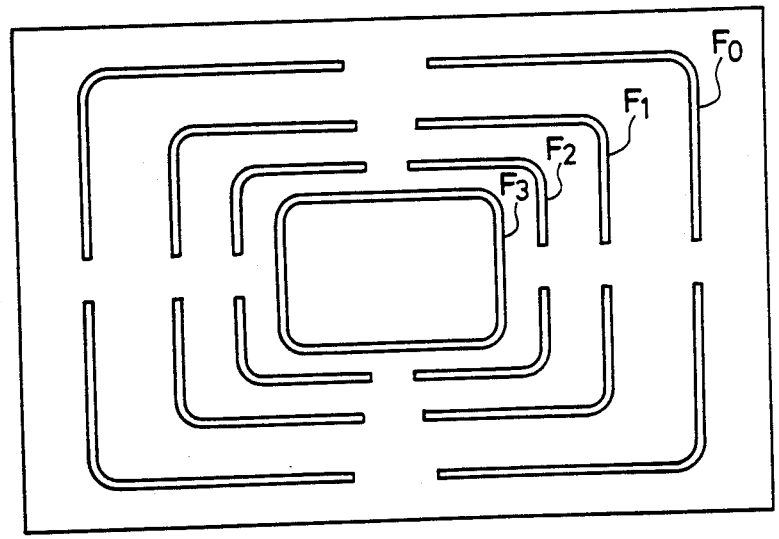
FIG. 6 is a schematic view showing a display in the camera finder field.

Referring now to FIG. 6, there are illustrated displays in the finder field effected by means of a liquid crystal display $LCD_2$. In the liquid crystal display $LCD_2$ there are provided four kinds of frames $F_0$, $F_1$, $F_2$ and $F_3$ each corresponding to the printing ranges of the real focal length photographing mode and trimming "1", "2" and "3" modes respectively. Any one of these frames is displayed selectively according to a set state of the trimming setting button 8. More particularly, in the finder field, the frame $F_0$ is displayed in the real focal length photographing mode; $F_1$ is displayed in the trimming "1" mode; F₂ is displayed in the trimming "2" mode; and F₃ displayed is in the trimming "3" mode and the close-up mode.

Figure 7:
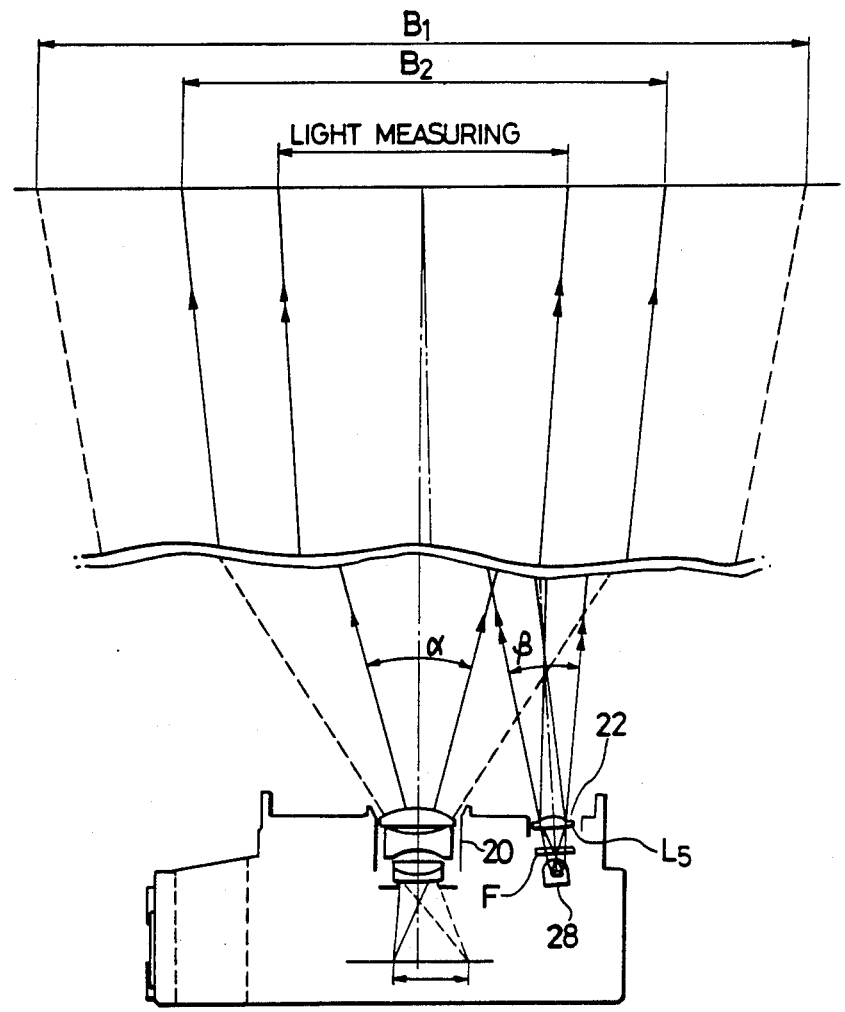
FIG. 7 is a sectional view showing a relation between a photographing range of a photographing lens and a light measuring range of a light measuring optical system both used in the camera.

Now, with reference to FIG. 7, the relation between the range photographed by a photographic lens 20 and printed, and a light measuring range of a light measuring system disposed in the interior of the light measuring window 22, will be explained. In FIG. 7, in the real focal length photographing mode, the range of $B_1$ is photographed by the photographic lens 20 and printed. In the trimming "3" mode of the smallest printing range, the range of $B_2$ is printed. It is assumed that the angle of the field of view of the photographic lens 20 relative to the smallest printing range $B_2$ is $\alpha$. On the other hand, behind the light measuring window 22 is disposed a light measuring optical system comprising a light measuring lens $L_5$, a filter F and a light receiving element 28. If its angle of the field of view is $\beta$, the relation thereof to $\alpha$ is $\alpha \geq \beta$. Under this construction, a light measuring range is always positioned within the range to be printed, whereby a light measuring information always corresponding to the range to be printed can be obtained accurately even if the pseudo focal length photographing mode is set.

Figure 8:
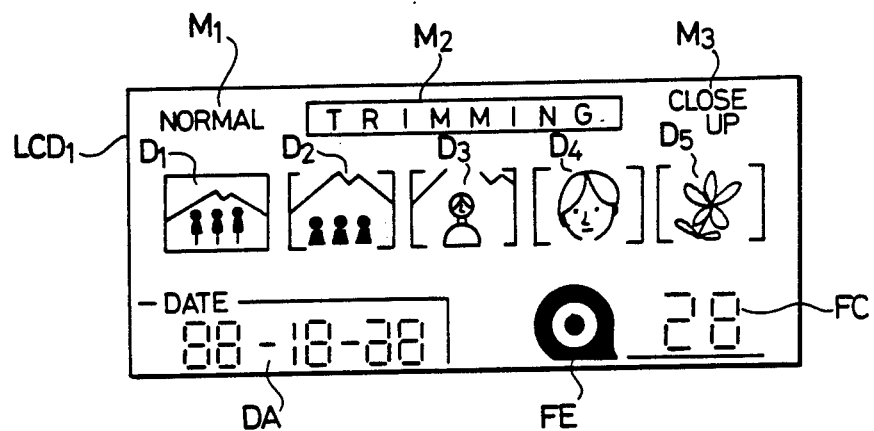
FIGS. 8 and 9 illustrate display modes of a liquid crystal display used in the camera.

Referring now to FIG. 8, there are illustrated display modes of the liquid crystal display $LCD_1$ shown in FIG. 1. Although all the display elements are indicated in FIG. 8, this does not actually occur. The marks $M_1$, $M_2$ and $M_3$ denote display elements which represent set modes of photographing of the camera. In the real focal length photographing mode, only the display element $M_1$ is indicated. When any one of the trimming modes "1", "2" and "3" is selected by operation of the trimming setting button 8, only the display element $M_2$ is indicated. On the other hand, upon selection of the close-up mode, only the display element $M_3$ is indicated.

The marks $D_1$, $D_2$, $D_3$, $D_4$ and $D_5$ represent display elements for indicating printing ranges according to photographing modes. In the real focal length photographing mode or normal photographing mode, the display element $D_1$ which shows the broadest printing range is indicated. In the case of the pseudo focal length photographing mode, any one of the display elements $D_2$, $D_3$ and $D_4$ is indicated selectively according to the trimming "1", "2" or "3" mode selected, together with the display element $D_1$. For example, in the trimming "1" mode which is of the broadest printing range in the pseudo focal length photographing mode, the display elements $D_1$ and $D_2$ are indicated; in the trimming "2" mode, the display elements $D_1$ and $D_3$ are indicated; and in the trimming "3" mode, the display elements $D_1$ and $D_4$ are indicated. Further, in the close-up photographing mode, the display element $D_5$ is indicated.

The mark DA represents a display element for indicating date data printed. The date data is not printed when its printing mode is not selected. The display element DA may be so constructed as to indicate a date even where printing of date data is not selected. The mark FC represents a display element for indicating the number of frames photographed. Further, the mark FE represents a display element for indicating a loaded state of the film. In this way, various photographing modes, printed date, the number of frames photographed, and the film loaded state, are indicated by the liquid crystal display $LCD_1$.

Figure 9:
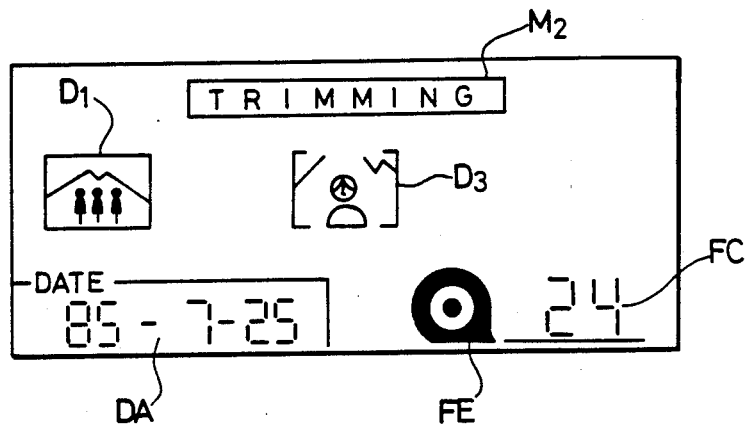

For example, FIG. 9 shows a display mode of the liquid crystal display $LCD_1$ in which the trimming "2" mode has been selected whereby the display elements $M_2$, $D_1$ and $D_3$ are indicated; data corresponding to "July 25, 1985" is printed as date data; "24" is indicated as the number of frames photographed; and a normal loaded state of the film is indicated.

Figure 10:
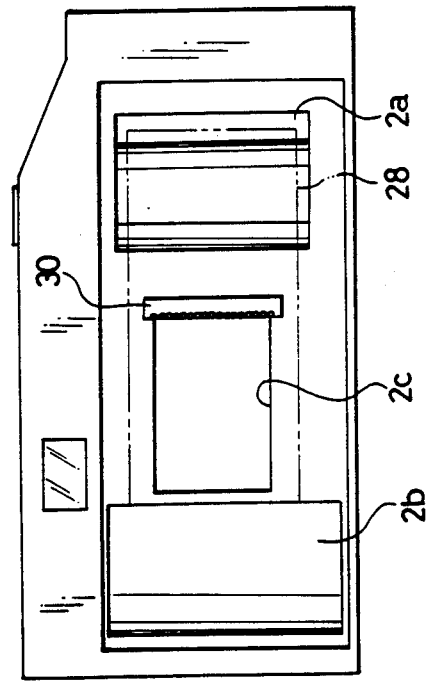
FIG. 10 illustrates the camera with a back cover open, viewed from the back.

Referring now to FIG. 10, there is illustrated the camera body 2 as viewed from the back, with a back lid thereof open. In FIG. 10, a spool chamber 2a for housing a spool 28 therein is provided in the camera body 2 in a right-hand position in the figure, while in a left-hand position in the figure there is provided a patrone chamber 2b for loading therein of a patrone. Consequently, the film when wound up is moved from the left to the right in the figure. Numeral 2c denotes a frame provided in a position corresponding to the film, and at the rightmost end thereof is disposed a code printing unit 30 for printing various photographic data as codes in the film.

Figure 12:
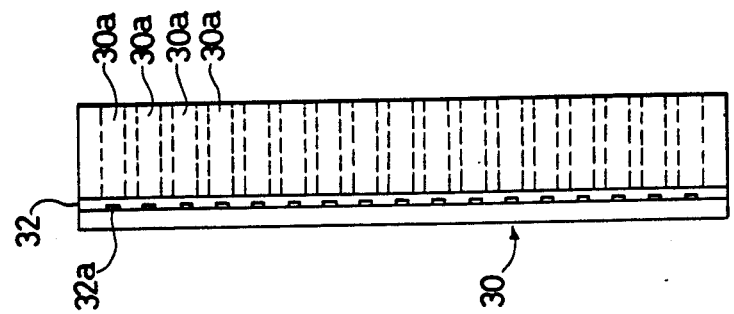
FIG. 12 is a longitudinal sectional view of the code printing,,unit.
Figure 11:
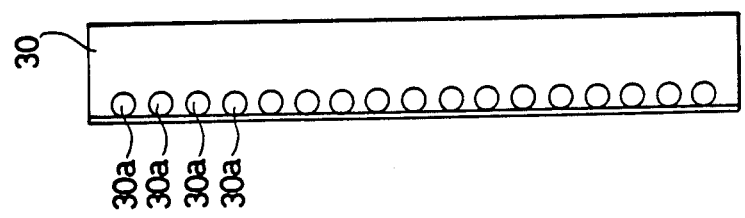
FIG. 11 is an enlarged front view of a code printing unit used in the camera, viewed from the back.

As shown in the enlarged view of FIG. 11, the code printing unit 30 has seventeen optical fibers 30a one ends of which are arranged longitudinally in the figure in an opposed relation to the emulsion surface of the film. The other ends of these many optical fibers 30a are opposed to seventeen light emitting diodes 32a which are fixed to a light emitting diode substrate 32, as shown in FIG. 12 which is an enlarged sectional view of the code printing unit 30.

FIG. 13 is an enlarged transverse sectional view of the code printing unit 30 and its vicinity, in which the mark FI represents a film loaded and wound up. The film FI is held in a predetermined position of the frame 2c under pressure by means of a pressure plate 40 which is given an appropriate pressure by a pressure plate spring 38, the spring 38 being fixed with pin 36 to a back lid 34 of the camera. The code printing unit 30 is fixed to the camera body and a light shielding tube 42, and on its face opposed to an optical axis of the photographic lens there is provided a light shielding plate 44. The light emitting diodes 32a are connected through a flexible board PB to a later-described light emitting diode driving circuit LEDR which functions to control ON-OFF of the light emitting diodes 32a, thereby setting a code to be printed on the film.

Consequently, a code corresponding to each frame is printed on the rightmost end of the frame when viewed from the back of the film, as shown in FIG. 14. More specifically, code $CO_1$ corresponds to frame $FI_1$, code $CO_2$ to frame $FI_2$ and code $CO_3$ to frame $FI_3$. The mark CR in FIG. 14 represents the range in which code is read; the right-hand side in the figure is the fore end side of the film, while the left-hand side is the patrone side.

For each frame of the film, each code is constituted by a 17-bit digital signal. Data represented by these bits will now be explained with reference to FIG. 15. FIG. 15 is a rear view of the film photographed, like FIG. 14, in which the right-hand side is the fore end side of the film. The 17-bit code comprises, successively from above in the figure, a 3-bit trimming information code Ct, a 1-bit date print permission or not permission information code Cs, a 4-bit year information code Cy, a 4-bit month information code Cm and a 5-bit day information code Cd. The trimming information code Ct will now be explained in detail. If the bits of this code Ct are assumed to be $b_1$, $b_2$ and $b_3$ successively from above in the figure, the relation between a set photographing condition and those bit signals is as shown in Table 2 below.

TABLE 2

| Photographing Mode | $b_1$ | $b_2$ | $b_3$ |
| --- | --- | --- | --- |
| Normal Mode | 0 | 0 | 0 |
| Trimming "1" Mode | 0 | 0 | 1 |
| Trimming "2" Mode | 0 | 1 | 0 |
| Trimming "3" Mode | 1 | 0 | 0 |
| Close-up Mode | 1 | 0 | 0 |

In the numeral columns of the above table, "1" indicates that the corresponding light emitting diode of that bit is turned ON, while "0" indicates turning OFF thereof.

The date print permission or not permission information code Cs becomes "1" in the case of printing a date and "0" when a date is not printed. As to the year information code Cy, month information code Cm and day information code Cd, data of year, month and day are converted to binary digits.

Figure 16:
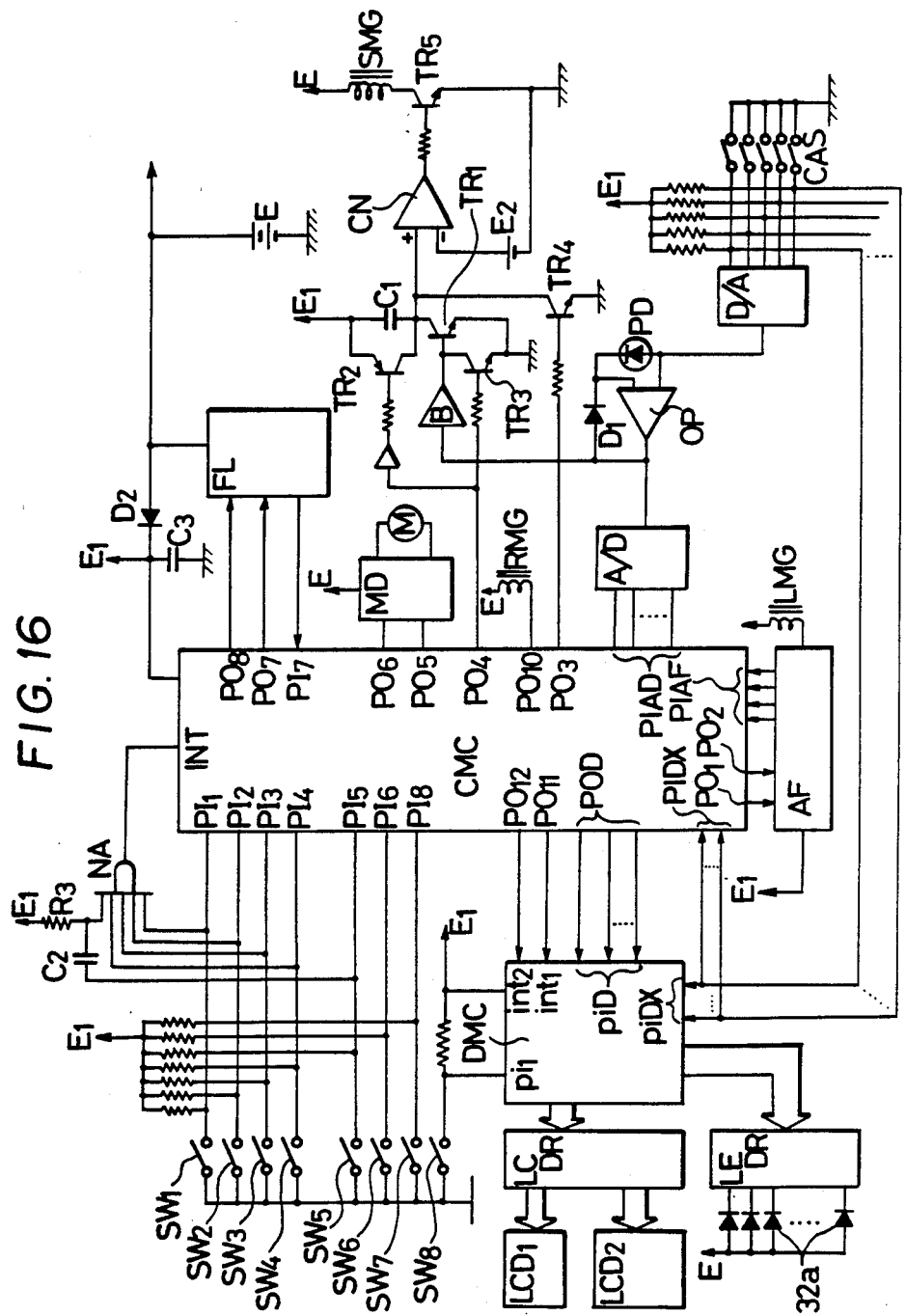
FIG. 16 is an electrical circuit diagram of the camera.

The following description is no provided about the electrical circuit in the camera of this embodiment, using the circuit diagram of FIG. 16. In FIG. 16, the mark $SW_1$ denotes a light measuring switch which is closed by the first-stage depression of the shutter release button 4 shown in FIG. 1; $SW_2$ denotes a release switch which is closed by depression up to the second stage of the button 4; $SW_3$ denotes a key switch which is opened and closed in interlock with the trimming setting button 8 shown in FIG. 1; $SW_4$ denotes a winding switch which is closed in response to shutter release and opened upon completion of the film winding; $SW_5$ denotes a back lid switch which is opened upon closing of the back lid 34 of the camera and opened upon opening of the same lid; $SW_6$ denotes a film sensing switch which is opened when the film is loaded and wound up and is closed when the film is not loaded; $SW_7$ denotes a count switch which is closed at the beginning of the shutter release operation and opened upon completion of charge of the shutter; and $SW_8$ denotes a date print selection switch which is closed when a date printing mode is selected and is opened when date printing mode is not selected.

The switches $SW_1$ to $SW_4$, which are starting switches, are connected to an interruption terminal INT of a controlling microcomputer CMC through a NAND gate NA and also connected directly to input terminals $PI_1$, $PI_2$, $PI_3$ and $PI_4$ of the controlling microcomputer CMC. Interruption to the controlling microcomputer CMC is caused by the positive edge of input to the interruption terminal INT. The switch $SW_5$ is connected to an input terminal of the NAND gate NA through a differential circuit comprising a capacitor $C_2$ and a resistor $R_3$. This is for setting the count value of the film counter to "0" when the back lid of the camera is opened. Further, the switches $SW_5$ to $SW_7$ are connected to input terminals $PI_5$, $PI_6$ and $PI_8$, respectively, of the controlling microcomputer CMC. The switches $SW_1$ to $SW_7$ are connected to a power terminal $E_1$ through pull-up resistors, respectively.

The mark E represents a power battery of the camera having an output which connected to an input terminal of the controlling microcomputer CMC through a stabilizing circuit comprising a diode $D_2$ and a capacitor $C_3$. To the circuits which are liable to cause erroneous action due to the change in voltage supplied thereto, electric power is fed from the power terminal $E_1$ stabilized by the stabilizing circuit, while to the other circuits the electric power is fed directly from the power battery E.

The mark FL represents a flash circuit including a flash tube for flash photography and a control circuit for the flash tube, in which a booster circuit for applying a high voltage to a main capacitor is operated with a signal provided from an output terminal $PO_7$ of the controlling microcomputer CMC, and flashing is started with a signal provided from an output terminal $PO_8$. Further, when the charging voltage for the main capacitor reaches a predetermined value, a charge completion signal is fed to the controlling microcomputer CMC through the input terminal $PI_7$.

The mark MD denotes a motor driving circuit which controls the film winding motor M. With a signal provided from an output terminal $PO_5$ of the controlling microcomputer CMC, the motor M is driven to wind up the film, and its drive is braked with a signal provided from an output terminal $PO_6$.

The mark CAS denotes film sensitivity reading switches which read data on film sensitivity prestored in the film patrone loaded into the camera and which are opened or closed according to the read data. The film sensitivity data as digital data read by each switch CAS is converted to an analog signal by means of a D/A converter (D/A). This analog film sensitivity signal is fed to a light measuring circuit comprising a photo diode PD, an operational amplifier OP and a logarithmic compressing diode $D_1$, in which it is added to a light measuring signal. The output of this light measuring circuit is therefore a light measuring signal with the film sensitivity signal added thereto. This signal is applied to the base of a transistor $TR_1$ through a buffer B and is subjected to a logarithmic expanding in a logarithmic expanding circuit comprising the transistor $TR_1$ and a capacitor $C_1$. The charging voltage for the capacitor $C_1$ is compared with a predetermined voltage $E_2$ by means of a comparator CN, and when it drops below $E_2$, a transistor $TR_5$ becomes non-conducting and a shutter magnet SMG is de-energized to close the shutter. Transistors $TR_2$ and $TR_3$ are controlled by an output terminal $PO_4$ of the controlling microcomputer CMC, and they are for controlling the timing of the energizing of the shutter magnet SMG and the logarithmic expanding. Further, a transistor $TR_4$ is controlled by an output terminal $PO_3$ of the controlling microcomputer CMC, and it is for charging the capacitor $C_1$ rapidly to change a maximum aperture value and to change a longest shutter speed according to the photographing mode selected, as will be described later.

The output of the light measuring circuit, which is a light measuring signal with the film sensitivity signal added thereto, is fed to an A/D converter (A/D) and converted to a digital signal, which in turn is fed to the controlling microcomputer CMC through input terminal PIAD. Further, the digital signal according to film sensitivity provided from each switch CAS is fed to the controlling microcomputer CMC from input terminal PIDX of the microcomputer and also fed to a later-described display microcomputer DMC.

The display microcomputer DMC controls the display of the liquid crystal display $LCD_1$ on the upper surface of the camera and that of the liquid crystal display $LCD_2$ in the finder, and it also controls the code printed in the film. It is supplied with the electric power through the power terminal $E_1$, and the date print selection switch $SW_8$ is connected to an input terminal $pi_1$ of the display microcomputer DMC. The display microcomputer DMC is constructed so that interruption is caused by a signal applied to an interruption terminal $int_1$ or $int_2$ which are connected to output terminals $PO_{11}$ and $PO_{12}$, respectively, of the controlling microcomputer CMC. Interruption to the interruption terminal $int_1$ is caused when changing the display of the liquid crystal displays $LCD_1$ and $LCD_2$, while interruption is caused to the interruption terminal $int_2$ at the time of printing code on the film.

Further, signals concerning photographing modes are each provided from the controlling microcomputer CMC to the display microcomputer DMC through output terminal POD and input terminal piD. Moreover, as mentioned above, signals on film sensitivity are each fed to input terminal piDX. Further, a clock circuit for determining a date to be printed on the film is incorporated in the display microcomputer DMC.

The display microcomputer DMC controls the liquid crystal display $LCD_1$ on the upper surface of the camera and the liquid crystal display $LCD_2$ in the finder, through a liquid crystal drive circuit LCDR. Therefore, photographing mode signal, date signal, film presence-absence signal, film winding-related signal, and date print permission or not permission signal, are transmitted from the display microcomputer DMC to the liquid crystal drive circuit LCDR, which in turn latches those data to be displayed. Further, the display microcomputer DMC turns ON or OFF the light emitting diodes 32a for code printing, through a light emitting diode driving circuit LEDR. The light emitting time of each light emitting diode 32a is varied according to the film sensitivity signal fed to the input terminal piDX.

The mark AF represents an automatic focusing circuit which measures the distance up to an object automatically and adjusts the focus position of the photographing lens according to the results of the measurement. The automatic focusing circuit AF, which is supplied with electric power from the power terminal $E_1$, starts its automatic focusing operation upon receipt of a signal from output terminal $PO_1$ of the controlling microcomputer CMC. The distance to the object thus detected is fed as a 4-bit digital signal to the controlling microcomputer CMC from input terminal PIAF. Output terminal $PO_2$ of the microcomputer CMC becomes "H" when the camera is set to the close-up mode, and all the bits of the distance signal related to the distance to the object ar made "H" to let the distance signal indicate the closest distance forcibly. At this time, therefore, the photographic lens is set in the closest state. The mark LMG represents a lens stopping magnet which is de-energized upon coincidence of the distance signal with a signal indicative of the shifting amount of the lens to stop the shifting of the photographing lens.

The RMG represents a release magnet for starting the shifting of the lens.. The release magnet RMG is controlled by a signal from output terminal $PO_{10}$ of the controlling microcomputer CMC. After energizing for a certain period of time, it is de-energized to disengage the photographic lens, thereby allowing the shifting of the photographic lens to start.

Figure 17:
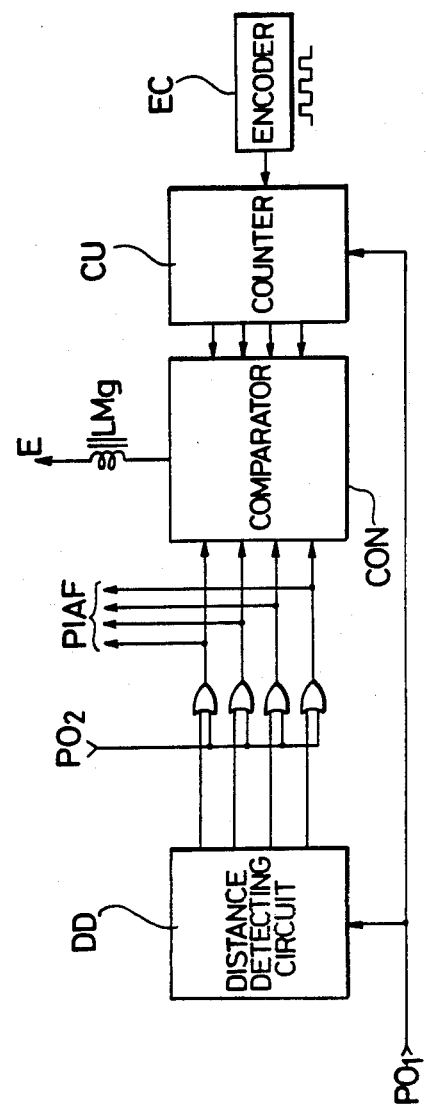
FIG. 17 is a block diagram showing a construction of an automatic focus adjusting circuit used in the camera.

A more detailed construction of the automatic focusing circuit AF is shown in FIG. 17, in which the mark DD represents a distance detecting circuit for measuring the distance up to an object, the operation of the circuit DD being started by a signal from output terminal $PO_1$ of the controlling microcomputer CMC. Its optical system is shown in FIG. 4. The distance to the object detected by the distance detecting circuit DD is output as a 4-bit digital signal, and the signal of each bit are fed to comparator CON through an OR circuit and also applied to the controlling microcomputer CMC through input terminal PIAF. To all the other input terminals of the OR circuit are connected the output terminal $PO_2$ of the microcomputer CMC. Therefore, when the close-up mode is selected, all the bits of the distance signal fed to the comparator CON are "H", representing the closest position, independently of the output signal from the distance detecting circuit DD.

On the other hand, the mark EC represents an encoder which provides pulses according to the shifting amount of the photographic lens. The pulses provided from the encoder EC are counted by a counter CU which is reset by a signal from the output terminal $PO_1$ of the controlling microcomputer CMC. This count value is compared with the distance signal by means of the comparator CON, which provides an output signal upon coincidence of both signals to de-energize the lens stop magnet LMG thereby stopping the shifting of the photographic lens in the position corresponding to the distance signal.

In the camera of this embodiment, when a frame is photographed in the pseudo focal length photographing mode, that is, the trimming "1", "2" or "3" mode or the close-up mode, the enlarging ratio of the frame becomes larger in printing if the frame is printed to the same size as that of a frame photographed in the real focal length photographing mode. Consequently, blur and flare which have not been conspicuous in the real focal length photographing mode become conspicuous. To avoid this, in the camera of this embodiment, the maximum aperture value (i.e. maximum F-number) and the longest (maximum) shutter speed are varied according to the printing size in the frame. Therefore, if the pseudo focal length photographing mode is selected, the depth of field is extended and the longest shutter speed (the maximum exposure time) is limited for avoiding the blurring of the object image on the film. Here, the larger the maximum aperture value, the shorter the maximum shutter speed, since the shutter is operated as an aperture diaphragm in this embodiment. But the present invention is not limited to this construction. It may be constructed so that only the maximum aperture value or only the shutter speed limit is changed according to the selected photographing mode.

Table 3 below shows photographing modes as well as maximum aperture values (maximum F-number) and lower limit values of the shutter speed in this embodiment.

TABLE 3

| Photographing Mode | Avmax | Tvmin |
| --- | --- | --- |
| Normal Mode | 2.8 | 1/30 |
| Trimming "1" Mode | 2.8 | 1/30 |
| Trimming "2" Mode | 4 | 1/60 |
| Trimming "3" Mode | 5.6 | 1/250 |
| Close-up Mode | 16 | 1/1000 |

Figure 18:
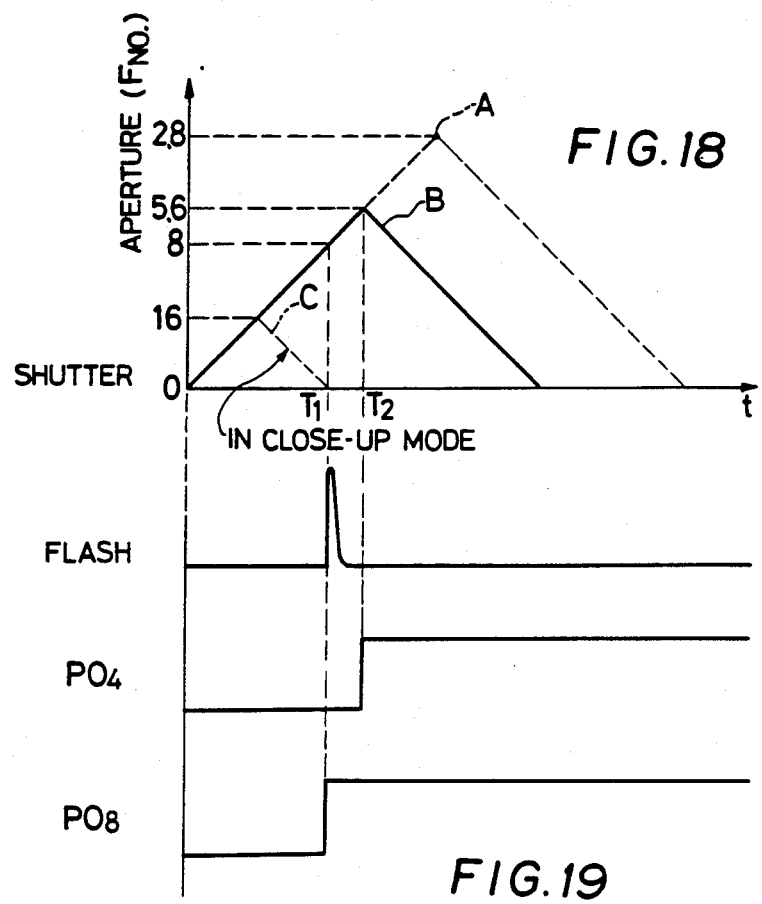
FIG. 18 is a graph showing a relation between aperture and exposure time and also showing a flash emission timing.

In the above table, "Avmax" and "Tvmin" represent maximum aperture value and longest limit value of the shutter speed, respectively. This is illustrated in FIG. 18, in which the vertical axis represents aperture value and the horizontal axis represents the time counted from the opening of the shutter. In the real focal length photographing mode or the trimming "1" mode, it is possible to open the aperture and to lengthen the shutter speed up to the combination of aperture value (F-number) 2.8 and shutter speed 1/30, as indicated by A. In the trimming "3" mode, the aperture can be opened and the shutter speed can be lengthened up to the combination of aperture value (F-number) 5.6 and shutter speed 1/60, as indicated by B. Further, in the close-up mode, only the combination of aperture value (F-number) 16 and shutter speed 1/1000 can be set. Where an appropriate exposure is not obtained under such combinations of limited apertures and shutter speeds, flashing is made automatically. As shown in the lower time chart of FIG. 18, where the combination of aperture value (F-number) 5.6 and shutter speed 1/60 causes under-exposure for example in the trimming "2" mode, a signal is issued from the output terminal $PO_8$ of the controlling microcomputer CMC at a time point $T_1$ at which the shutter also serving as aperture is opened up to an aperture value (F-number) of 8 calculated in accordance with the distance signal provided from the automatic focusing circuit AF, whereby flashing is started. And at a time point $T_2$ at which the shutter is opened up to an aperture value (F-number) of 5.6, a signal is issued from the output terminal $PO_4$, whereby the shutter closing operation is started.

In this connection, an exposure value EV for change-over to flashing is also changed according to the selected photographing mode. Table 4 shows the relation between photographing mode and exposure values (assumed to be Evc) for change-over to flashing.

TABLE 4

| Photographing Mode | Exposure Value for Change-over |
|---|---|
| Normal Mode | Ev 8 |
| Trimming "1" Mode | Ev 8 |
| Trimming "2" Mode | Ev 10 |
| Trimming "3" Mode | Ev 12 |
| Close-up Mode | Ev 18 |

If the subject brightness is Bv, film sensitivity Sv, aperture value Av and shutter speed Tv in APEX calculation, the exposure value Ev (or Evc) is defined as follows:

EV (or Evc)=Bv+Sv=Av+Tv

Figure 19:
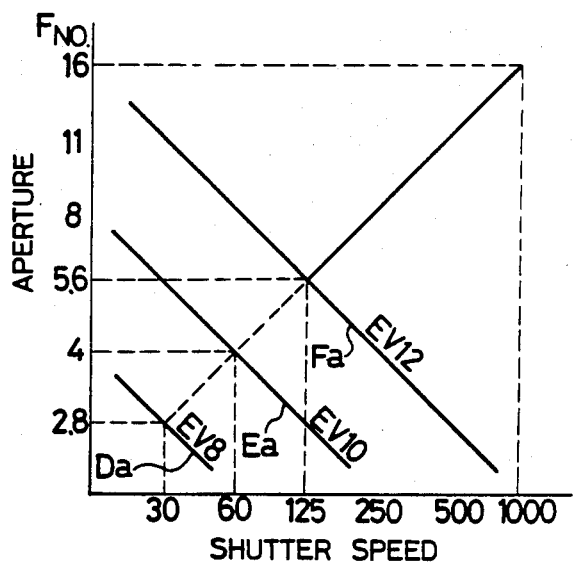
FIG. 19 is a graph showing a relation between aperture and exposure time at the time of change-over to flash photography.

The relation between aperture value at the time of change-over to flashing and shutter speed value is shown in FIG. 19, in which its vertical axis represents aperture value and its horizontal axis represents shutter speed. In the real focal length photographing mode and the trimming "1" mode, flashing is not made at an exposure value Ev of 8 or more as indicated by Da, while in the trimming "2" mode, flashing is not made only at an exposure value Ev of 10 or more like Ea. Further, in the trimming "3" mode, flashing is not made only at an exposure value Ev of 12 or more like Fa, and in the close-up mode, flashing is made only at an exposure value Ev of 18 or more (not shown). This is for minimizing the aperture to make the depth of field large in the case where the enlarging ratio in printing is large.

Figure 20A:
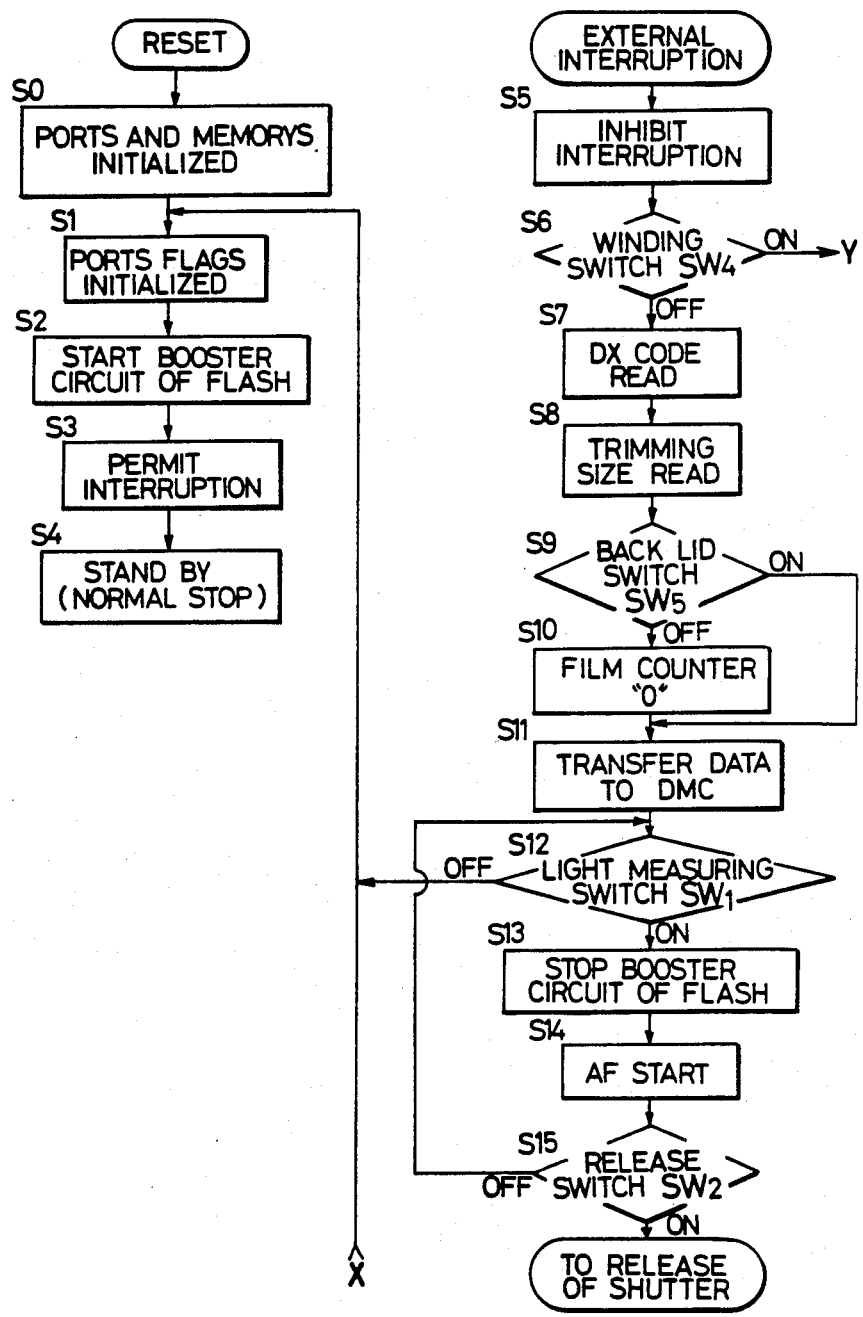

The operation of the controlling microcomputer CMC for controlling the camera of this embodiment will now be explained with reference to FIGS. 20A, 20B and 20C which are a flow chart showing operations of the controlling microcomputer CMC in the camera of this embodiment illustrated in FIG. 16. In FIG. 20A, circuits are reset upon power ON reset caused by loading of the battery, then in step S0 the input ports, the output ports and memory of the controlling microcomputer CMC are all initialized. More specifically, all the other output terminals than $PO_{10}$ of the microcomputer CMC are so initialized as to output "L", and the photographing mode is initialized to the real focal length photographing mode. Then, in step S1, each port and flag of the controlling microcomputer CMC are initialized and in step S2 there is made an issue of "H" signal at the output terminal $PO_7$ of the same microcomputer, whereby the booster circuit in the flash circuit FL is allowed to start operation. Then, in step S3, an external interruption to the interruption terminal INT of the controlling microcomputer CMC is permitted and in step S4 the microcomputer assumes a state of normal stop.

Then, when an external interruption is caused to the interruption terminal INT of the controlling microcomputer CMC by any one of depression of the shutter release button 4, depression of the trimming setting button 8, winding up of the film, and opening or closing of the back lid, other external interruptions are inhibited in step S5 and the program advances to step S6. In step S6 ("step" will be omitted hereinafter), an open or closed state of the winding switch $SW_4$ connected to the input terminal $PI_4$ of the controlling microcomputer CMC is detected. If the switch $SW_4$ is open (OFF) and the winding of the film is over, the program advances to S7, in which DX code data on film sensitivity of the switch CAS is received from the input terminal PIDX. Then in S8, data on photographing mode (trimming size) is received from the input terminal $PI_3$ to which is connected the key switch $SW_3$ interlocked with the trimming setting button 8. The details will be described later.

Then in S9, an open or closed state of the back lid switch $SW_5$ is detected from the input terminal $PI_5$ and if the back lid is open and the back lid switch $SW_5$ is opened (OFF), the program advances to S10, in which the count value of the film counter for counting the number of frames photographed of the film is set to "0". If the back lid is closed and the back lid switch $SW_5$ is closed (ON) in S9, the program advances to S11 without passing through S10. In S11, data necessary for display is transmitted from the controlling microcomputer CMC to the display microcomputer DMC after interruption from the display rewriting output terminal $PO_{11}$, whereby display is made by the liquid crystal displays $LCD_1$ and $LCD_2$.

Then in S12, an open or closed state of the light measuring switch $SW_1$ interlocked with the shutter release button 4 is detected from the input terminal $PI_1$, and if the switch $SW_1$ is open (OFF), the program returns to S1 and the microcomputer CMC enters the normal stop condition of S4. If the light measuring switch $SW_1$ is closed (ON) at S12, there is made a falling of the signal at the output terminal $PO_7$ is made "L" to stop boosting by booster circuit in the flash circuit FL in S13. Then, in S14, the automatic focusing circuit AF is operated by a start signal provided from the output terminal $PO_1$ of the controlling microcomputer CMC, and in S15 an open or closed state of the release switch $SW_2$ interlocked with the shutter release button 4 is detected from the input terminal $PI_2$. If the release switch $SW_2$ is open (OFF), the program returns to S12 and the operations from S12 to S15 are repeated for waiting for closing the release switch $SW_2$ by the depression of shutter release button 4 to the second stage. If a closed state of the release switch $SW_2$ is detected in step S15, the program advances to shutter releasing operations from S16 as will be described later.

Figure 20B:
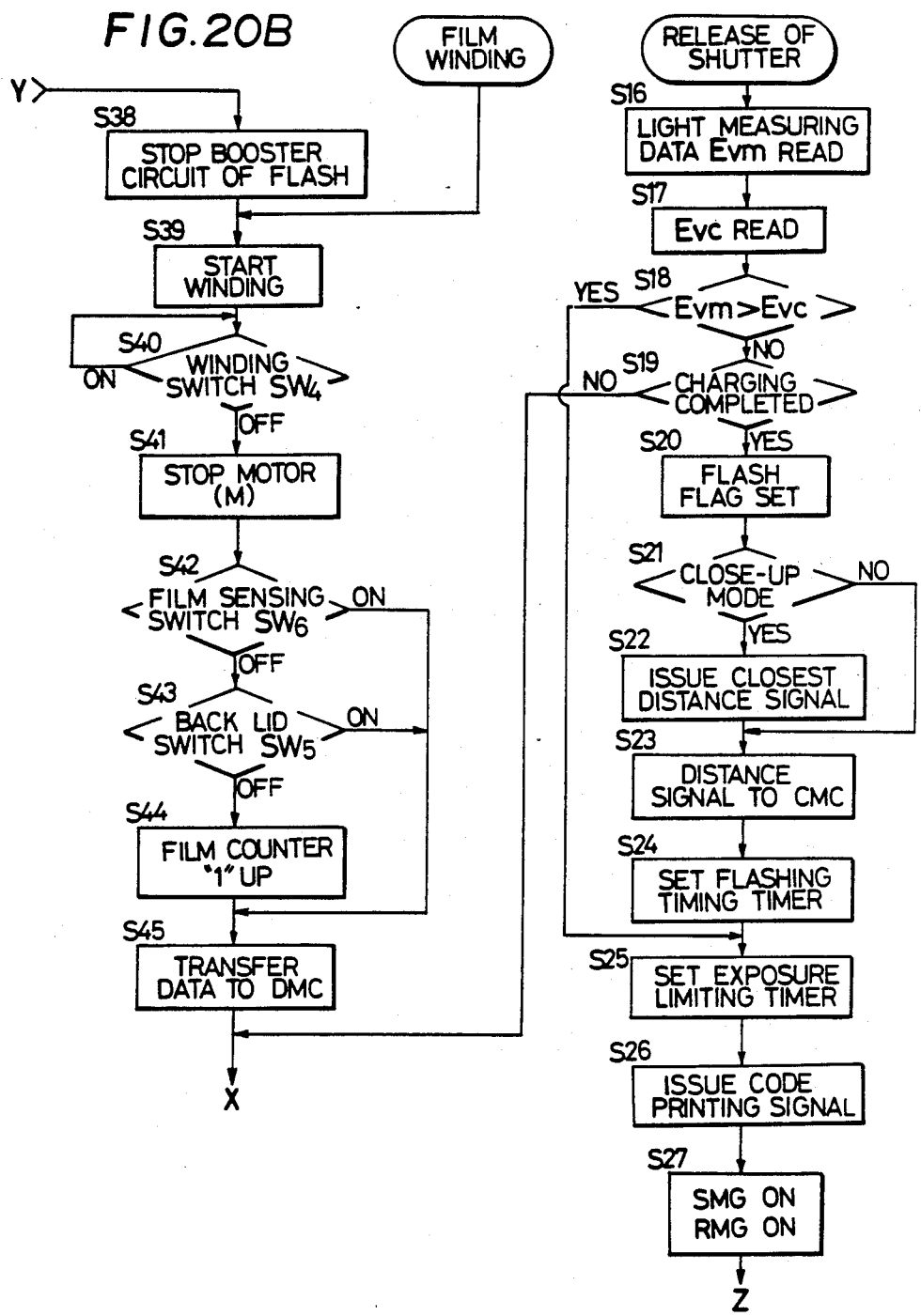

On the other hand, if a closed (ON) condition of the winding switch $SW_4$ is detected in S6, this means that the winding of the film has not been completed yet, so the program advances to S38 in FIG. 20B to stop boosting of the flash circuit FL and enters a winding routine from S39. In S39, the motor driving circuit MD is driven by a signal provided from the output terminal $PO_5$ of the controlling microcomputer CMC to start operation of the film winding motor M, thereby allowing the winding of the film to start. Then, in S40, an open or closed state of the winding switch $SW_4$ is detected to detect completion of the winding of the film. The motor M is driven until the winding switch $SW_4$ is opened (OFF) upon completion of the film winding. Once opening (OFF) of the winding switch $SW_4$ is detected in S40, the rotation of the motor M is stopped to stop the winding of the film in S41, then the program advances to S42.

In S42, an open or closed state of the film sensing switch $SW_6$ is detected from the input terminal $PI_6$ of the controlling microcomputer CMC. If the film is not loaded in the camera and the film sensing switch $SW_6$ is closed (ON), data necessary for display is transmitted from the controlling microcomputer CMC to the display microcomputer DMC in step S45, then the program returns to S1 and the microcomputer assumes the state of normal stop in S4. If it is detected in step S42 that the film has been wound up and the film sensing switch $SW_6$ is open in S42, the program advances to S43 and an open or closed state of the back lid switch $SW_5$ is detected. In S43, if the back lid is open and the back lid switch $SW_5$ is closed (ON), the program advances to S45, in which data necessary for display is transmitted from the controlling microcomputer CMC to the display microcomputer DMC. Then, the program returns to S1 and the microcomputer assumes the state of normal stop in S4. If the back lid is closed and the back lid switch $SW_5$ is open (OFF) in S43, the program advances to S44 and the count value of the film counter is incremented by "1", then the program advances to S45, in which data necessary for display is transmitted from the controlling microcomputer CMC to the display microcomputer DMC. Then, the program returns to S1 and the microcomputer assumes the state of normal stop in S4. Under such a construction, the film counter is prevented from counting up when the back lid of the camera is open or when the film is not loaded in the camera.

The release routine from S16 will now be explained. In S16, the light measuring signal which takes the film sensitivity into account is fed from the A/D converter (A/D) to the controlling microcomputer CMC through the input terminal PIAD. This light measuring signal is assumed to be a light measuring data Evm. Then, in S17, an exposure value Evc according to the set photographing mode is read from ROM because of different exposure values Evc for change-over to flashing according to photographing modes as shown in FIG. 19 of this embodiment. Then, in S18, a comparison is made between the light measuring data Evm and the exposure value Evc for change-over to flash photographing, and if Evm>Evc, the program advances to S25 as will be described later. On the other hand, if the relation of the two is not Evm>Evc, this means that the light measuring data Evm is lower than the exposure value Evc for change-over to flash photography, so whether the charging of the main capacitor for flashing in the flash circuit FL has been completed or not is judged from the input terminal $PI_7$ of the controlling microcomputer CMC in S19. If said charging is over, the program advances to S20 to set a flashing flag indicative of a flash photography. On the other hand, if the charging has not been completed yet, the program returns to S1, waiting for the completion of the charging in S4.

In S21, whether the photographing mode is set to the close-up mode or not is judged, and if the answer is negative, a signal on the distance to object is fed from the automatic focusing circuit AF to the controlling microcomputer CMC through the input terminal PIAF in S23. On the other hand, if it is judged in S21 that the photographing mode is set to the close-up mode, the program advances to S22, in which a signal of "H" is transmitted from the output terminal $PO_2$ of the controlling microcomputer CMC to the automatic focusing circuit AF to make the signal indicative of the distance to object forcibly into a signal corresponding to the closest distance. Likewise, in step S23, a signal on the distance to object is fed from the automatic focusing circuit AF to the controlling microcomputer CMC through the input terminal PIAF.

In S24, the controlling microcomputer CMC reads from ROM a value corresponding to the signal on the distance to object fed from the terminal PIAF and sets it to a flash timing timer provided in the controlling microcomputer CMC. This is because in the case of flash photography an aperture value is determined according to the distance to object by means of a flashmatic mechanism and a flash timing is determined according to the said aperture value as shown in FIG. 18. Then, in S25, the controlling microcomputer CMC reads a value according to the photographing mode from ROM and sets it to an exposure limiting timer. This is because in this embodiment the maximum aperture value and the longest shutter speed are limited according to photographing modes.

In S26, a printing signal is provided from the output terminal $PO_1$ of the controlling microcomputer CMC and code data are printed outside the frame of the film according to ON-OFF state of the corresponding light emitting diodes 32a. Then, in S27, the shutter magnet SMG is energized by the positive edge of a signal from the output terminal $PO_4$ of the controlling microcomputer CMC and the operation of the release magnet RMG is started by the signal from the output terminal $PO_{10}$, thereby causing shifting of the photographic lens after a certain time. Then, in S28 in FIG. 20C, an open or closed state of the trigger switch $SW_7$ is detected from the input terminal $PI_8$ of the controlling microcomputer CMC, waiting for closing of the same switch. If the trigger switch $SW_7$ is closed (ON) at the beginning of the shutter release operation, the program advances to S29, in which integration of the quantity of light exposed is started. In this connection, the light measuring system in this embodiment has a sub aperture whose diameter varies according to the quantity of light passing through the lens shutter, and the charging of the capacitor $C_1$ is started upon start of integration of the quantity of light exposed.

In S30, judgment is made as to whether a flashing flag indicative of a flash photography is set or not. If the said fag is set, the program advances to S31, in which the flash timing timer is started and timer interruption is permitted, then the program advances to S32. If the flashing is not set in S30, the program advances to S32 directly, in which the exposure limiting timer having a preset time value according to an appropriate exposure is started. And in S33 there is made judgment continuously as to whether this timer overflows or not. Since a lens shutter which serves as both an aperture and a shutter is used in this embodiment, an aperture value and a shutter speed value are set simultaneously by a single exposure limiting timer. However, the camera may be constructed so that the aperture and the shutter speed are controlled separately and hence their combination can be changed variously.

If an overflow of the exposure limiting timer is detected in S33, the program advances to S34, the transistor TR4 conducts upon the positive edge of a signal at the output terminal PO3 of the controlling microcomputer CMC, whereby the shutter magnet SMG is deenergized forcibly to close the shutter serving also as an aperture, and thus exposure is terminated. After waiting for a complete closing of the shutter for a predetermined period of time, the program returns to the winding routine which begins with S39.

Referring now to FIG. 21, there is illustrated the timer interruption routine mentioned in step S31. Upon timer interruption, timer interruption is inhibited in S36, then in S37 a flashing signal is issued by the positive edge of a signal from the output terminal PO8 of the controlling microcomputer CMC, whereby flashing is effected and the program is returned to the original step.

Figure 22:
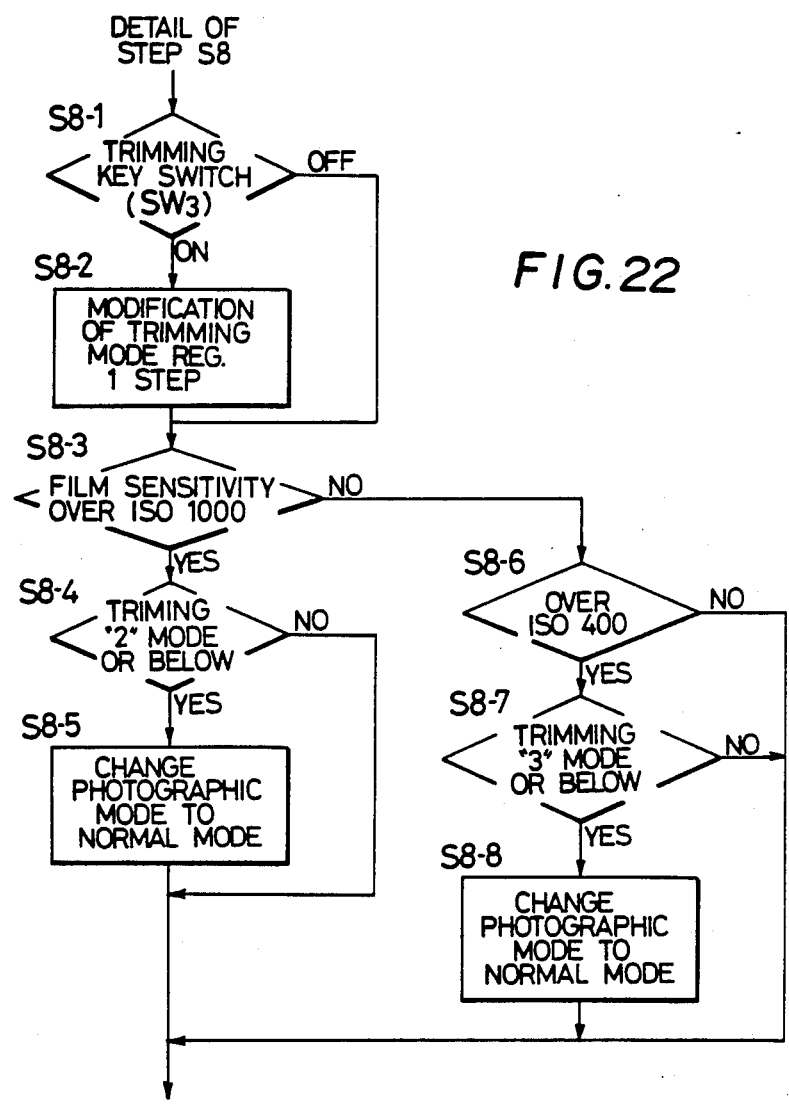
FIG. 22 is a flow chart showing details of step S8 therein.

The operation of step S8 in FIG. 20A will now be explained in more detail with reference to FIG. 22. In FIG. 22, first in S8-1, an open or closed state of the trimming key switch SW3 is detected. If the key switch SW3 is closed (ON), the program advances to S8-2, in which there is made a single step modification of a trimming mode register, then the program advances to S8-3. If the trimming key switch SW3 is open in S8-1, the program advances to S8-3 without going through S8-2. In S8-3, judgment is made as to whether the sensitivity of the loaded film fed from the switch CAS t the input terminal PIDX is over ISO 1000 or not. If the answer is affirmative, the program advances to S8-4, in which judgment is made as to whether the photographing mode is below the trimming "2" mode or not. If the answer is affirmative, the photographing mode is changed to the real focal length photographing mode or normal photographing mode in S8-5.

On the other hand, if it is judged in S8-3 that the sensitivity of the loaded film is below ISO 1000, the program advances to S8-6, in which there is made judgment as to whether the sensitivity of the said film is above ISO 400 or not. If the answer is affirmative, the program advances to S8-7 to judge whether the photographing mode is below the trimming "3" mode or not, and if the answer is affirmative, the photographing mode is returned to the real focal length photographing mode or normal photographing mode in S8-8. Where the film sensitivity is not above ISO 400 in S8-6, and where the photographing mode is no below the trimming "3" mode in S8-7, it is not specially necessary to change the photographing mode.

Figure 23:
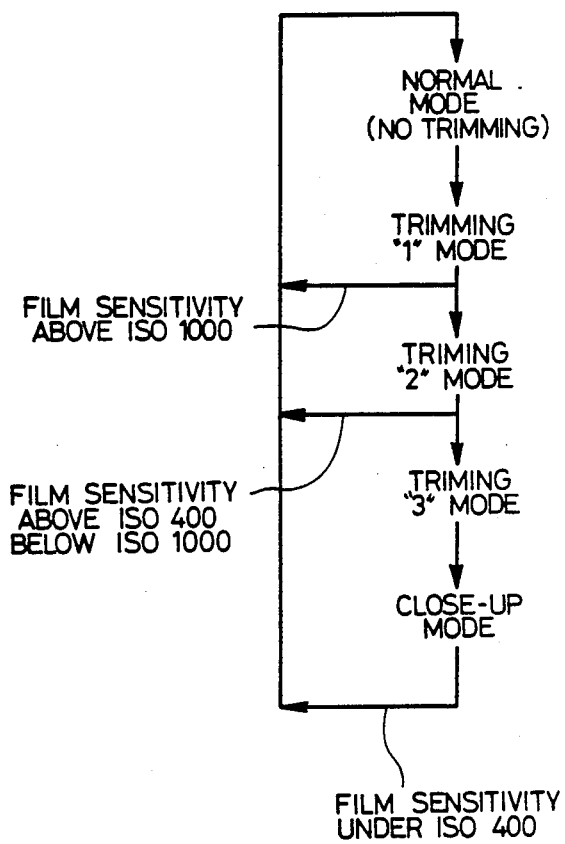
FIG. 23 is a schematic view showing operation thereof in a typical manner.

Therefore, according to this embodiment, as shown in Fig. 23, when the sensitivity of the loaded film is below ISO 400, the photographing mode is changed at every depression of the trimming setting button 8, from normal photographing mode to trimming "1" mode, from trimming "1" mode to trimming "2" mode, from trimming "2" mode to trimming "3" mode, from trimming "3" mode to close-up mode, and from close-up mode to normal photographing mode. On the other hand, when the film sensitivity is above ISO 400 and below ISO 1000, if the trimming setting button 8 is depressed from the trimming "2" mode, the photographing mode returns to the normal photographing mode and is not set to the trimming "3" mode and the close-up mode. Further, where a high sensitivity film of above ISO 1000 is used, depression of the trimming setting button 8 from the trimming "1" mode causes the photographing mode to return to the normal photographing mode, without being set to the trimming "2" and "3" modes and the close-up mode. This is for the following reason. The higher the sensitivity of film, the more coarse the particles thereof, so the trimming and close-up photographing modes requiring a large enlarging ratio in printing become undesirable as the film sensitivity becomes higher, so in this embodiment the limit of trimming is made different according to film sensitivities.

Figure 24:
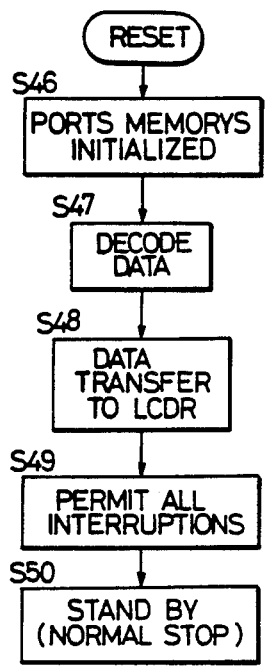
FIGS. 24, 25 and 26 are each a flow chart showing operation of a microcomputer for display.

The operation of the display microcomputer (DMC) used in this embodiment will now be explained using the flow charts of FIGS. 24 to 26. First, in S46, all the input ports, the output ports and memory of the display microcomputer DMC are initialized. For example, the clock mechanism incorporated in the display microcomputer DMC is initialized to "Jan. 1, 1985", the photographing mode initialized to the real focal length photographing mode and the count value of the film counter initialized to "0". Then, in S47, the stored contents of data necessary for display and printing to the film are decoded, then in S48 the said data are transmitted to the liquid crystal driving circuit LCDR, allowing the liquid crystal displays LCD1 and LCD2 to display the necessary data. In S49, all interruptions are permitted and in S50 the microcomputer DMC assumes the state of normal stop.

Figure 25:
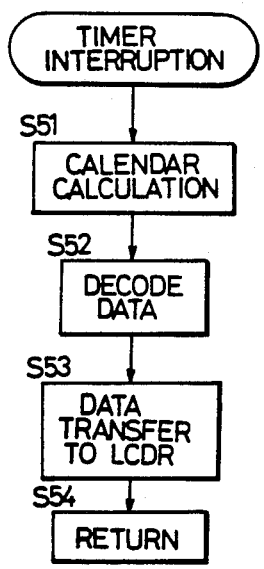

FIG. 25 is a flow chart showing timer interruption to the display microcomputer DMC. Construction is made so that this timer interruption is caused at every second. Upon timer interruption, a calendar calculation is performed in S51 on the basis of the clock mechanism incorporated in the display microcomputer DMC, then in S52 the calculated data is decoded, then in S53 the display date provided to the liquid crystal driving circuit LCDR is changed, and in S54 the program returns to the original step.

Figure 26:
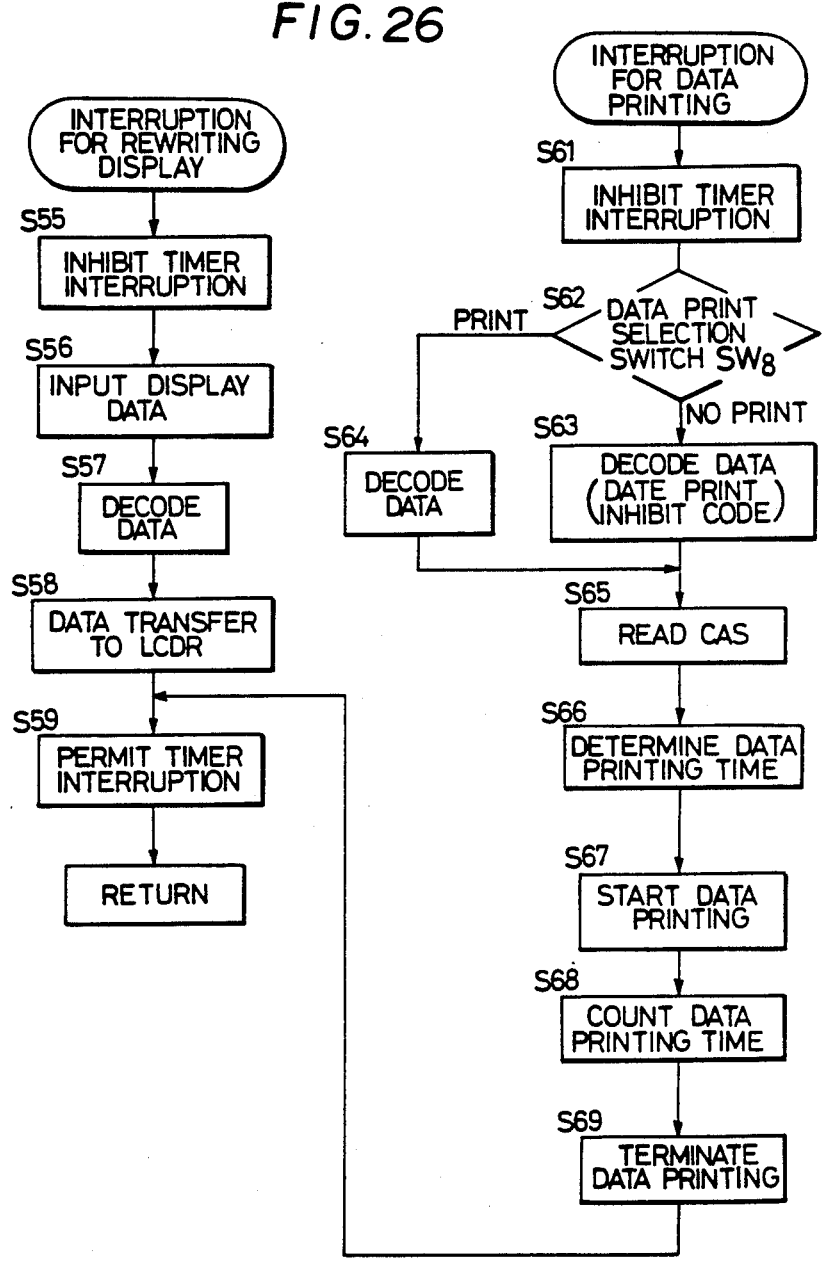

Further, FIG. 26 is a flow chart showing both interruption for rewriting display and interruption for printing code on the film. First, when interruption is caused by positive edge of an input signal to the interruption terminal int1 of the display microcomputer DMC, the timer interruption shown in FIG. 25 is inhibited in S55. In the case of timer interruption after S55, this is stored and the timer interruption is executed just after permission thereof. Then, in S56, display data such as the count value of the film counter and the photographing mode are received from the input terminal piD, then in S57 the thus-input data and date data are decoded, then in S58 the thus-decoded data are provided to the liquid crystal driving circuit LCDR to change the display of the liquid crystal displays LCD1 and LCD2, and in S59 the timer interruption is permitted and the program returns to the original step.

On the other hand, when interruption is caused by the positive edge of an input signal to the interruption terminal int2 of the display microcomputer DMC, the timer interruption shown in FIG. 25 is inhibited in S61, and an open or closed state of the date print selection switch $SW_8$ connected to the input terminal $pi_1$ is detected in S62. Where this date print selection switch $SW_8$ is open and the printing of the date is not selected, the program advances to S63, in which data corresponding to the date print inhibiting code is decoded. Then, the program advances to S65. On the other hand, where the date print selection switching $SW_8$ is closed to select the printing of date in S62, data corresponding to the date to be printed is decoded and the program advances to S65.

In S65, the sensitivity of the loaded film is read from the input terminal piDX connected t the switch CAS, then in S66 a code printing time (i.e. light emission time of the light emitting diode 32a) is determined according to the read film sensitivity, and the printing of code is started in S67. The printing time thus determined is counted in S68 and the printing of code is terminated in S69, then the program advances to S59 to permit timer interruption.

Figure 27:
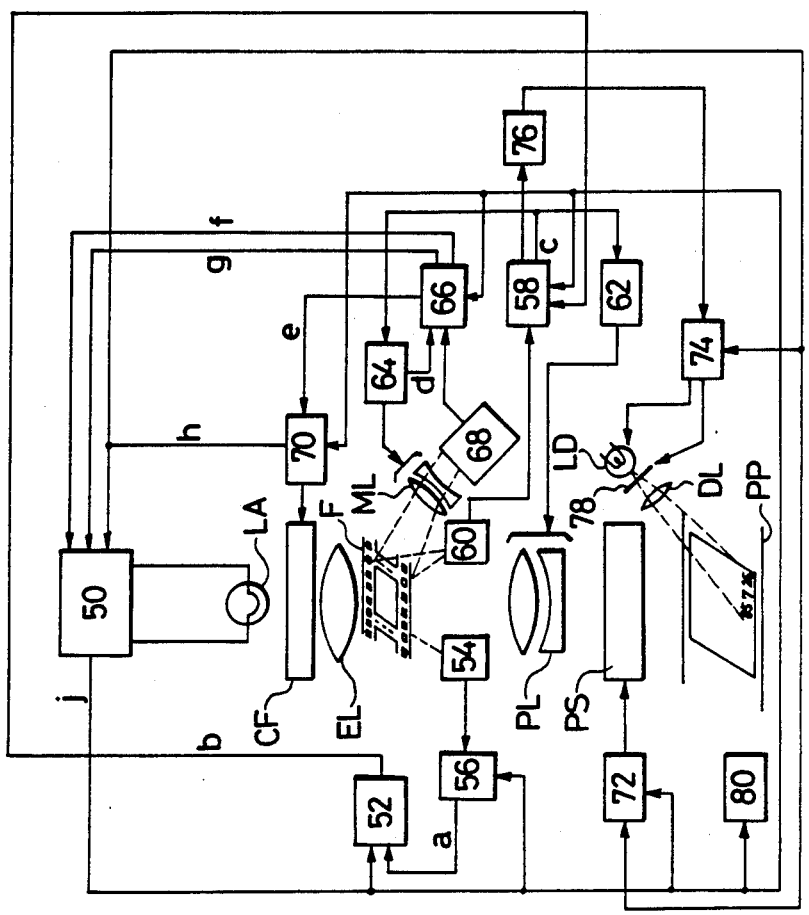
FIG. 27 is a block diagram showing an automatic printer used in the system of this embodiment.

Referring now to FIG. 27, there is illustrated a construction of an automatic printer included in the system of the embodiment which printer performs an automatic printing operation for printing the film photographed by the camera of this embodiment onto a photographic paper. In FIG. 27, the mark LA represents a printing lamp; the mark CF represents a color filter for the adjustment of color balance corresponding to the three primary colors of red, green and blue; and the mark EL represents an enlarging lens. Light emitted from the lamp LA is applied to a film F located in a print position through the color filter CF and lens EL. The light which has passed through the film F is projected onto a photographic paper PP through a printing zoom lens PL whereby it is printed. The construction of this automatic printer as well as its operation will be explained below.

Numeral 50 denotes a lamp control circuit for controlling ON-OFF of the lamp LA. The lamp LA is used not only as a printing light source but also for detecting a frame and in a film feeding state, for reading the code printed in the film and for exposure determining light measurement.

Numeral 52 denotes a film feeding device for feeding the film photographed by the camera toward the carrier of the printer, the film F being moved in the right-hand direction in the figure. The density of the film being led rightwards is monitored by a CCD line sensor or MOS type line sensor 54. Further, a change in density of the film thus being monitored is detected by a frame end detector 56 which receives an output signal from the MOS type line sensor 54, whereupon the feeding of the film by the film feeding device 52 is stopped. More specifically, as shown in the time chart of Fig. 28, the feed of the film is stopped by negative edge of a signal a fed from the frame end detector 56 to the film feeding device 52, whereby one frame of the film is disposed just in the printing position. The frame of the film after printing is wound up successively by a film take-up unit (not shown).

When the feed of the film is stopped, a code reader 58 is operated by a signal b issued from the film feeding device 52, whereby the codes printed on the vicinity of the frame located in the print position are read through a line sensor 60. More particularly, data concerning the photographing mode of the frame printed, whether date is to be printed or not, and the date of print, are read by the code reader 58. The data on the photographing mode thus read by the code reader 58 is transmitted as signal c to a printing zoom lens controller 62 for setting a printing magnification of the printing zoom lens PL and also to a light measuring zoom lens controller 64 for setting the magnification of the photometric zoom lens ML. Magnifications of both zoom lenses ML and PL are set according to the photographing mode data, and in the case where the pseudo focal length photographing mode is set in photographing, a photometric range on the frame and an enlargement ratio onto the photographic paper are determined according to the trimming size. Thus, even in the pseudo focal length photographing mode, only the range to be printed on the photographic paper can be accurately measured photometrically, and printing can be done in an enlarged state to a predetermined size independently of the trimming size.

Upon completion of the magnification setting for the photometric zoom lens ML by the photometric zoom lens controller 64, an exposure calculation is performed by an exposure calculation circuit 66 in accordance with a signal d indicative of that completion. This exposure calculation is performed on the basis of an output of a photometric circuit 68 which receives the light from the frame located in the print position through the photometric zoom lens ML, and there are calculated color balance and exposure value according to that frame. The thus calculated data on color balance is transmitted as a signal e to a filter controller 70 and used for the adjustment of color balance. On the other hand, the data on exposure value is transmitted as a signal f to the lamp controlling circuit 50 and used for determining the quantity of light to be emitted by the lamp LA. Further, a signal g which represents the end of photometry is also transmitted from the exposure calculating circuit 66 to the lamp controlling circuit 50 whereby the lamp LA is turned OFF for a while.

Then, the filter controller 70 effects setting of the color filter CF according to the color balance data provided from the photometric circuit 68, and upon completion of this setting, a signal h which represents the completion of the filter setting is issued from the filter controller 70.

The signal h is transmitted to the lamp controlling circuit 50, also to a shutter controller 72 for controlling the opening and closing of a shutter PS disposed in front of a photographic paper PP in the print position, and further to a date print controller 74 which controls whether date is to be printed or not within the frame of the photographic paper printed. Data concerning the date to be printed on the photographic paper, read by the code reader 58, is decoded through a decoder 76 and fed to the date print controller 74. In accordance with this data the date print controller 74 sets year, month and day for a date plate 78 which shows a date to be printed.

Upon input of the signal h, the shutter controller 72 begins to open the shutter PS, and after the lapse of a certain time from inputting of the signal h until the shutter PS opens fully, the lamp controller 50 turns the lamp LA on to effect printing. On the other hand, if the printing of the date is selected by the code printed i the film, then after the lapse of a certain time from inputting of the signal h until when the shutter PS opens fully, the date print controller 74 turns the lamp LD on to effect printing of the date. The mark DL represents a date printing lens, whereby the year, month and day set on the date plate 78 are projected and printed within the frame of the photographic paper. Where the printing of date is not selected by the code printed in the film, the date is not printed because the lamp LD is not turned ON.

The lighting time of the date printing lamp LD is so controlled as to be constant by the date print controller 74, and the lighting time of the date printing lamp LD is so set as to be shorter than the duration of printing performed by the lamp LA. On the other hand, the film printing lamp LA is constructed so that the lighting time and the light intensity are controlled by the lamp controlling circuit 50 according to data on exposure value.

When the printing by the lamp LA is completed, the lamp controlling circuit 50 turn the lamp LA off and thereafter issues an exposure end signal j, whereupon the film feeding device 52 starts the feeding of the film and the shutter controller 72 closes the shutter PS. The exposure end signal j is also fed to a photographic paper feeding device 80, which in turn moves the photographic paper PP rightwards in the figure, ready for the next printing. The exposure end signal j is further fed to the frame end detector 56, code reader 58, exposure calculating circuit 66 and filter controller 70, which are thereby reset, ready for the next printing. The photographic paper printed is received into a photographic paper receiving device and thus printing is effected.

In the camera of this embodiment, a date to be printed is recorded in the film in the form of codes, so even if the film is seen directly, it is difficult to recognize the date. Particularly, in the case of using a reversal film which is seldom printed on a photographic paper, even if a date is printed in the form of codes on the film, the date is not useful. For the use of such a reversal film, a date printing device for a printing date as a numerical value in a frame of the film may be incorporated in the camera as in the prior art so that when a reversal film is used a date is printed as a numerical value in the film by the date printing device. For discrimination whether the loaded film is an ordinary negative film or a reversal film, there may be used data on film latitude among the data recorded in the film patrone. More particularly, data on film latitude (e.g. data called "exposure range") is detected from among the film sensitivity data provided from the switch CAS in this embodiment and where it is judged that the loaded film is a reversal film, there may be used a conventional date printing device which prints a date as a numerical value in the film. Alternatively, construction may be made so that a date printing device is selected manually according to the loaded film.

Further, in the case of a reversal film, printing is usually not performed, so the camera may be constructed so that the switching to the pseudo focal length photographing mode (trimming "1", "2", "3" mode and close-up mode) is inhibited upon detection of a loaded reversal film.

In this embodiment, the pseudo focal length photographing mode with has three modes each of the pseudo focal lengths being different from each other, namely the trimming "1", "2", "3" modes. And, the maximum aperture value (minimum F-number) and the longest (maximum) shutter speed are limited and are changed in accordance with the pseudo focal length in the pseudo focal length photographing mode. But the present invention is not limited thereto. It may be constructed so that the minimum F value or the maximum shutter speed is changed over according to whether the pseudo focal length photographing mode is selected or not. With such a change of limit value, a warning value such as a camera shake warning may be changed over according to whether the pseudo focal length photographing mode is selected or not. Although this embodiment is constructed so that in the event an appropriate exposure is not obtained even at the maximum shutter speed limit, flashing is done automatically, construction may be made so that a light emitting portion of the flashing device is projected from the camera body to urge the user to use the flashing device.

In a camera capable of automatically controlling its exposure, the aperture value set in aperture priority shutter speed automatic controlling mode should be limited according to whether the pseudo focal length photographing mode is selected or not, the aperture value calculated in shutter speed priority aperture automatic controlling mode and in programmed exposure controlling mode should be limited according thereto.

Further, although the camera of this embodiment is constructed so that the aperture and the shutter speed change in a triangular form as shown in FIG. 18, construction may be made so that they change in a trapezoidal form and where the pseudo focal length photographing mode is selected, the height of such trapezoidal form is limited to thereby limit the aperture.

Moreover, although the automatic printer used in this embodiment is constructed so that data are printed in a corner of the object printed range, the present invention is not limited thereto. It may be constructed so that data are printed in the white frame portion outside the object printed range. Further, where data are also printed in the object printed range, the color of data to be printed may be changed for easier discrimination of data. Alternatively, construction may be made so that the position for easy discrimination of the color of data is searched and data is printed in that position. Additionally, the data printing optical system may be adjusted so that the position and size of printed data are changed according to print sizes, thereby facilitating the confirmation of printed data and eliminating the influence on the object printed.

Further, construction may be made so that the codes printed in the film comprise magnetic codes which are memorized in a magnetic recording layer applied onto the film. The data printed as codes are not limited to such photographed year, month and day as in the above embodiment. They may be data of hour, minute and second, photographic exposure data, and a consecutive number.

Moreover, although in the automatic printer of the above embodiment the printing optical system and the photometric optical system are provided each independently, a part of them may be used in common to both. For example, a light receiving element for photometry may be disposed on the shutter (PS) shown in FIG. 27.

Further, although the above embodiment is constructed so that data are printed outside the photographed frame in the film, the present invention is not limited thereto. A light shielding means for shielding the incidence of light from an object may be provided in a corner of one frame photographed or in a predetermined region near the lower side thereof, to thereby effect the shielding of light only when the pseudo focal length photographing mode is selected or at all times, and data may be printed in the thus-shielded range.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being include therein.

What is claimed is:

1. A photographic camera having a photographic lens, comprising;

means for selecting a real focal length photographing mode in which a normal range in a frame of a film will be printed on a photographing paper and a pseudo focal length photographing mode in which a range smaller than the normal range in a frame of the film will be printed on a photographing paper;

means for outputting a pseudo focal length signal when the pseudo focal length photographing mode is selected;

means for exposing a film to be photographed on the basis of a predetermined program determining a combination of aperture value and shutter speed according to the brightness of an object to be photographed;

means for determining a limit exposure value in accordance with an exposure time corresponding to the pseudo focal length and to characteristic of the exposing means;

means for measuring light coming from the object to be photographed for calculating an exposure value;

means for comparing the calculated exposure value with the determined limit exposure value to produce a flash signal when the calculated exposure value is smaller than the determined limit exposure value;

means for illuminating the object with flash light emission;

means for controlling the flash means to permit the flash light emission of the flash means in accordance with the flash signal;

means for controlling the exposing means in accordance with the calculated exposure value when the calculated exposure value is larger than the determined limit exposure value and in accordance with the determined limit exposure value when the calculated exposure value is smaller than the determined limit exposure value; and means for recording a signal corresponding to the pseudo focal length photographing mode when the pseudo focal length photographing mode is selected.

2. A photographic camera as claimed in claim 1 further comprising means for discriminating whether the shutter speed calculated in accordance with the measured light is longer than a limited shutter speed corresponding to the determined limit exposure value to produce a low speed limit signal when the calculated shutter speed is longer than the limited shutter speed, and wherein the flash controlling means permits the flash light emission in accordance with the low speed limit signal.

* * * * *